US012676134B2

(12) United States Patent
Joshi et al.

(10) Patent No.: US 12,676,134 B2
(45) Date of Patent: Jul. 7, 2026

(54) AUDIO FENCING SYSTEM AND METHOD

(71) Applicant: Shure Acquisition Holdings, Inc., Niles, IL (US)

(72) Inventors: Bijal Joshi, Elk Grove Village, IL (US); Justin Joseph Sconza, Chicago, IL (US); Guillaume Lamy, Chicago, IL (US); John Casey Gibbs, Chicago, IL (US); Zachary Kane, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 54 days.

(21) Appl. No.: 18/593,944

(22) Filed: Mar. 3, 2024

(65) Prior Publication Data

US 2024/0296821 A1 Sep. 5, 2024

Related U.S. Application Data

(60) Provisional application No. 63/449,845, filed on Mar. 3, 2023.

(51) Int. Cl.
*G10K 11/175* (2006.01)
*H04R 3/00* (2006.01)

(52) U.S. Cl.
CPC ......... *G10K 11/1754* (2020.05); *H04R 3/005* (2013.01); *H04R 2410/01* (2013.01)

(58) Field of Classification Search
CPC . G10K 11/1754; G10L 21/0208; G10L 25/30; G10L 2021/02166; H04R 1/406; H04R 3/005; H04R 2410/01
USPC ........................................................ 381/73.1
See application file for complete search history.

(56) References Cited

U.S. PATENT DOCUMENTS

| | | | |
|---|---|---|---|
| 4,658,425 | A | 4/1987 | Julstrom |
| 5,297,210 | A | 3/1994 | Julstrom |
| 7,983,907 | B2 | 7/2011 | Erik |
| 8,554,556 | B2 | 10/2013 | Yu |

(Continued)

FOREIGN PATENT DOCUMENTS

| | | |
|---|---|---|
| CN | 107093429 | 8/2017 |
| CN | 108028979 | 5/2018 |

(Continued)

OTHER PUBLICATIONS

International Search Report and Written Opinion for PCT/US2024/018277 dated May 22, 2024, 11 pp.

(Continued)

*Primary Examiner* — Paul Kim
(74) *Attorney, Agent, or Firm* — Alston & Bird LLP

(57) ABSTRACT

Systems and methods are provided herein for deploying, using at least one microphone, a first microphone lobe towards a first location, the first microphone lobe configured to capture one or more first audio signals from a first audio source located within a first audio pick-up region; deploying, using the at least one microphone, a second microphone lobe towards a second location, the second microphone lobe configured to capture one or more second audio signals from a second audio source located outside the first audio pick-up region; and removing, using at least one processor, off-axis noise from the one or more first audio signals by applying, to the one or more first audio signals, a mask determined based on the one or more second audio signals.

19 Claims, 5 Drawing Sheets

(56) References Cited

U.S. PATENT DOCUMENTS

| | | | |
|---|---|---|---|
| 8,644,477 | B2 | 2/2014 | Gilbert |
| 8,908,883 | B2 | 12/2014 | Bai |
| 9,226,070 | B2 | 12/2015 | Hyun |
| 9,544,692 | B2 | 1/2017 | Hui |
| 9,601,131 | B2 | 3/2017 | Chen |
| 9,659,555 | B1 | 5/2017 | Hilmes |
| 9,706,300 | B2 | 7/2017 | Kim |
| 9,747,920 | B2 | 8/2017 | Ayrapetian |
| 9,805,734 | B2 | 10/2017 | Sugiyama |
| 9,818,425 | B1 | 11/2017 | Ayrapetian |
| 10,229,698 | B1 | 3/2019 | Chhetri |
| 10,262,677 | B2 | 4/2019 | Bocko |
| 11,302,347 | B2 | 4/2022 | Penniman |
| 11,398,241 | B1 | 7/2022 | Mansour |
| 11,438,691 | B2 | 9/2022 | Veselinovic |
| 11,817,112 | B2 | 11/2023 | Hu |
| 2007/0160230 | A1 | 7/2007 | Nakagomi |
| 2016/0275961 | A1 | 9/2016 | Yu |
| 2019/0304427 | A1 | 10/2019 | Kemmerer |
| 2019/0364359 | A1 | 11/2019 | Ferguson |
| 2020/0322722 | A1 | 10/2020 | Chen |
| 2021/0193131 | A1 * | 6/2021 | Hook ..................... H04R 3/005 |
| 2023/0224636 | A1 | 7/2023 | Veselinovic |

FOREIGN PATENT DOCUMENTS

| | | |
|---|---|---|
| CN | 111435598 | 7/2020 |
| EP | 1830348 | 9/2007 |
| EP | 3707716 | 9/2020 |
| WO | 2023021390 | 2/2023 |

OTHER PUBLICATIONS

Hu, et al., "Monaural Speech Segregation Based on Pitch Tracking and Amplitude Modulation," IEEE Transactions on Neural Networks, vol. 15, No. 5, Sep. 2004, 16 pp.

Rafaely, et al., "Spherical Microphone Array Beamforming," Chapter 11, Speech Processing in Modern Communication, Springer Topics in Signal Processing, vol. 3, 2010, 25 pp.

Tashev, et al., "Microphone Array for Headset with Spatial Noise Suppressor," Microsoft Research, Sep. 2005, 4 pp.

* cited by examiner

AUDIO FENCING SYSTEM AND METHOD

CROSS-REFERENCE

This application claims priority to U.S. Provisional Patent Application No. 63/449,845, filed on Mar. 3, 2023, the contents of which are incorporated by reference herein in its entirety.

TECHNICAL FIELD

This disclosure generally relates to removal of unwanted sounds from a desired audio signal in an audio fencing scenario. In particular, the disclosure relates to systems and methods for using audio signals captured by one or more lobes deployed outside a desired audio coverage area to remove unwanted sounds from a desired audio signal.

BACKGROUND

Audio environments, such as conference rooms, boardrooms, and other meeting rooms, video conferencing settings, and the like, can involve the use of multiple microphones or microphone array lobes for capturing sound from various audio sources. The audio sources may include human speakers, for example. The captured sounds may be disseminated to a local audience in the environment through speakers (for sound reinforcement) and/or to others located remotely (such as via a telecast, webcast, or the like). For example, persons in a conference room may be conducting a conference call with persons at a remote location. Each of the microphones or array lobes may form a channel. The captured sound may be input as multi-channel audio and provided or output as a single mixed audio channel.

In general, audio capturing devices, such as, e.g., conferencing devices, are available in a variety of sizes, form factors, mounting options, and wiring options to suit the needs of particular environments. The types of conferencing devices, their operational characteristics (e.g., lobe direction, gain, etc.), and their placement in a particular audio environment may depend on a number of factors, including, for example, the locations of the audio sources, locations of listeners, physical space requirements, aesthetics, room layout, and/or other considerations. For example, in some environments, a conferencing device may be placed on a table or lectern to be near the audio sources and/or listeners. In other environments, a conferencing device may be mounted overhead or on a wall to capture the sound from, or project sound towards, the entire room, for example.

Some existing audio systems ensure optimal audio coverage of a given environment by delineating "audio coverage areas," which represent the regions in the environment that are designated for capturing audio signals, such as, e.g., speech produced by human speakers. The audio coverage areas define the spaces where beamformed audio pick-up lobes can be deployed by the microphones, for example. A given environment or room can include one or more audio coverage areas, depending on the size, shape, and type of environment. For example, the audio coverage area for a typical conference room may include the seating areas around a conference table, while the audio coverage area for a typical classroom may include the space around a blackboard and/or podium at the front of the room. Some audio systems have fixed audio coverage areas, while other audio system are configured to dynamically create audio coverage areas for a given environment.

In some cases, the sounds captured within a given audio coverage area include speech from the human speakers, as well as unwanted audio, like errant non-voice or non-human noises in the environment (such as, e.g., sudden, impulsive, or recurrent sounds like shuffling of papers, opening of bags and containers, chewing, sneezing, coughing, typing, etc.), errant voice noises, such as side comments, side conversations between other persons in the environment, etc., or other noise interference. Noise reduction techniques can be used to reduce certain background, static, or stationary noise, such as fan and HVAC system noises. However, such noise reduction techniques are not ideal for reducing or rejecting errant noises, unwanted speech, and other spurious noise interference. Voice activity detection (VAD) algorithms that detect the presence or absence of human speech or voice in an audio stream may also be applied to one or more channels of a microphone to minimize unwanted audio in the captured sound. However, the VAD technique may not be effective in removing errant human speech from the desired audio stream. An automixer can automatically reduce the strength of a particular microphone's audio input signal to mitigate the contribution of background, static, or stationary noise, when the microphone is not capturing human speech or voice. However, complete, or near complete, rejection of unwanted audio may compromise the performance of existing automixers, since automixers typically rely on relatively simple rules to select which channel to "gate" on, such as, e.g., first time of arrival or highest amplitude at a given moment in time.

SUMMARY

The techniques of this disclosure provide systems and methods designed to, among other things: (1) deploy a beamformed audio lobe towards an audio source located outside a designated audio coverage area; and (2) use audio captured by the "out-of-coverage" lobe to remove, from a desired audio mix, unwanted sounds produced by an out-of-coverage audio source.

One exemplary embodiment includes a method using at least one processor in communication with at least one microphone, the method comprising: deploying, using the at least one microphone, a first microphone lobe towards a first location, the first microphone lobe configured to capture one or more first audio signals from a first audio source located within a first audio pick-up region; deploying, using the at least one microphone, a second microphone lobe towards a second location, the second microphone lobe configured to capture one or more second audio signals from a second audio source located outside the first audio pick-up region; and removing, using the at least one processor, off-axis noise from the one or more first audio signals by applying, to the one or more first audio signals, a mask determined based on the one or more second audio signals.

Another exemplary embodiment includes a system comprising: at least one microphone configured to deploy a first microphone lobe towards a first location to capture one or more first audio signals from a first audio source located within a first audio pick-up region, and deploy a second microphone lobe towards a second location to capture one or more second audio signals from a second audio source located outside the first audio pick-up region; and at least one processor communicatively coupled to the at least one microphone and configured to remove off-axis noise from the one or more first audio signals by applying, to the one or more first audio signals, a mask determined based on the one or more second audio signals.

Another exemplary embodiment includes a non-transitory computer-readable medium comprising instructions that, when executed by at least one processor, cause the at least one processor to perform: deploy, using the at least one microphone, a first microphone lobe towards a first location for capturing one or more first audio signals from a first audio source located within a first audio pick-up region; deploy, using the at least one microphone, a second microphone lobe towards a second location for capturing one or more second audio signals from a second audio source located outside the first audio pick-up region; and remove off-axis noise from the one or more first audio signals by applying, to the one or more first audio signals, a mask determined based on the one or more second audio signals.

Another exemplary embodiment includes a digital signal processing (DSP) component configured to: receive one or more first audio signals associated with a first location; receive one or more second audio signals associated with a second location; identify the first location as being within a first audio pick-up region; identify the second location as being outside the first audio pick-up region; generate a first audio mix using the one or more first audio signals; generate a second audio mix using the one or more second audio signals; and remove off-axis noise from the first audio mix by applying, to the first audio mix, a mask determined based on the second audio mix. According to some aspects, the DSP component is further configured to deploy a first microphone lobe towards the first location to pick-up the one or more first audio signals; and deploy a second microphone lobe towards the second location to pick-up the one or more second audio signals.

Another exemplary embodiment includes a non-transitory computer-readable medium comprising instructions that, when executed by at least one processor, cause the at least one processor to perform: receive one or more first audio signals associated with a first location; receive one or more second audio signals associated with a second location; identify the first location as being within a first audio pick-up region; identify the second location as being outside the first audio pick-up region; generate a first audio mix using the one or more first audio signals; generate a second audio mix using the one or more second audio signals; and remove off-axis noise from the first audio mix by applying, to the first audio mix, a mask determined based on the second audio mix.

Another exemplary embodiment includes a method using at least one processor in communication with at least one microphone, the method comprising: receiving one or more first audio signals associated with a first location; receiving one or more second audio signals associated with a second location; identifying the first location as being within a first audio pick-up region; identifying the second location as being outside the first audio pick-up region; generating a first audio mix using the one or more first audio signals; generating a second audio mix using the one or more second audio signals; and removing off-axis noise from the first audio mix by applying, to the first audio mix, a mask determined based on the second audio mix. According to some aspects, the method further comprises deploying a first microphone lobe towards the first location to pick-up the one or more first audio signals; and deploying a second microphone lobe towards the second location to pick-up the one or more second audio signals.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
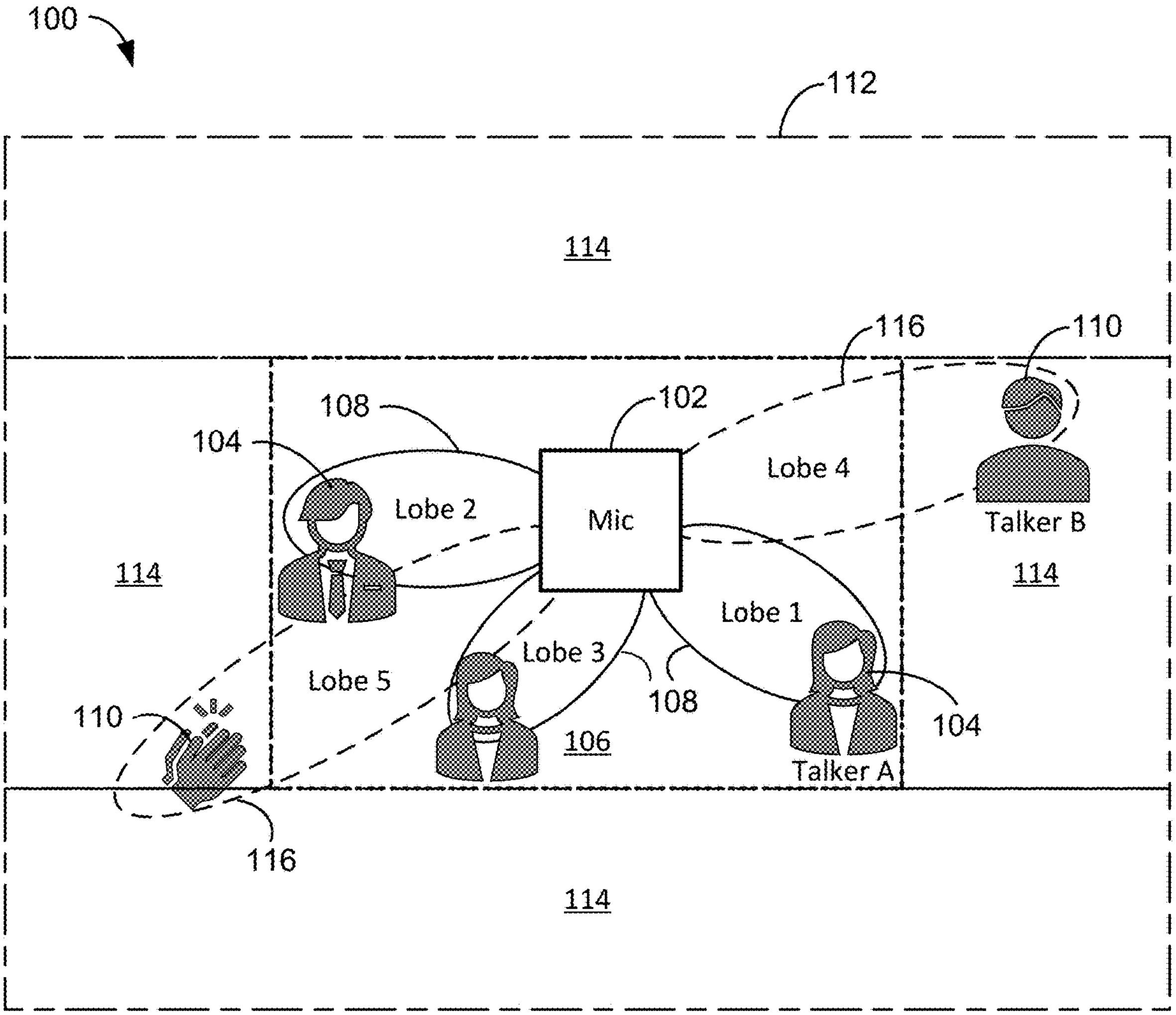
FIG. 1 is a schematic diagram of an exemplary environment with an audio coverage area designated around a microphone, in accordance with one or more embodiments.

In general, audio systems use audio coverage areas to focus one or more beamformed audio pick-up lobes on sounds produced by audio sources located within a predefined region, or acceptance zone, of a given environment (e.g., room), and the audio signals captured by the audio pick-up lobes are provided to respective channels of an automixer to generate a desired audio mix. When a detected audio source falls outside an audio coverage area, existing audio systems simply refrain from deploying a lobe towards the source location and rely on the natural decay of an audio signal to prevent, or at least minimize, detection of such "out-of-coverage" sounds by nearby active lobes. However, in some cases, the out-of-coverage sounds, which can include human speech and/or noise, may bleed or leak into the audio captured by the "in-coverage" lobes (also known as "acoustic bleeding") and thus, may be present in the desired audio mix as "off-axis" noise. For example, during double-talk scenarios, or when a person inside the audio coverage area and another person located just outside the audio coverage area are talking at the same time, the lobes focused within the audio coverage area may capture both the in-coverage speech and the out-of-coverage speech. The latter, unwanted audio may also present problems with appropriate automixer channel selection, which attempts to avoid errant noises while still selecting the channel(s) that contain voice.

Systems and methods are provided herein for actively locating sounds from audio sources located outside an audio coverage area and using the "out-of-coverage" sounds to remove off-axis noise from a desired audio mix captured inside the audio coverage area. For example, embodiments include using at least one microphone of an audio system to detect out-of-coverage audio, or unwanted sounds produced by an audio source located outside an audio coverage area, and deploy a dedicated audio pick-up lobe towards the out-of-coverage audio source in order to track or capture the sounds coming from that audio source. The at least one microphone may also deploy one or more audio pick-up lobes towards audio sources located within the audio coverage area in order to capture sounds coming from the "in-coverage" audio sources. The audio signals captured by the dedicated lobe (or "out-of-coverage audio signals") are provided to one input of a source remover, while the desired audio signals captured by active lobes deployed within the audio coverage area (or "in-coverage audio signals") are provided to another input of the source remover. The source remover generates a mask based on the out-of-coverage audio signals and the in-coverage audio signals, and applies that mask to the in-coverage audio signals to remove off-axis noise due to the out-of-coverage audio signals.

As used herein, the terms "lobe" and "microphone lobe" refer to a beamformed audio beam generated by a given microphone array (or array microphone) to pick up audio signals at a select location, such as the location towards which the lobe is directed. While the techniques disclosed herein are described with reference to microphone lobes generated by array microphones, the same or similar techniques may be utilized with other forms or types of microphone coverage (e.g., a cardioid pattern, etc.) and/or with microphones that are not array microphones (e.g., a handheld microphone, boundary microphone, lavalier microphones, etc.). Thus, the term "lobe" is intended to cover any type of audio beam or coverage.

FIG. 1 illustrates an exemplary conferencing or other audio environment 100 comprising a microphone 102 and a plurality of audio sources 104, in accordance with embodiments. The audio environment 100 may be a conference room, a boardroom, a classroom, or other meeting room; a theater, sports arena, auditorium, or other performance or event venue; or any other space. The audio sources 104 may be human speakers or talkers participating in a conference call, telecast, webcast, class, seminar, performance, sporting event, or any other event, and may be situated at different locations around the environment 100. For example, the audio sources 104 may be local participants of a conference call seated in respective chairs disposed around a table, or local audience members seated in chairs arranged in front of a podium or other presentation space.

The microphone 102 can be configured to detect sounds from the audio sources 104, such as human voice or speech spoken by the audio sources 104 and/or music, clapping, or other sounds generated by the same, and convert the detected sounds into one or more audio signals. The microphone 102 may also capture other sounds present in the environment 100, including undesirable or unwanted sounds such as background noise (e.g., from fans, vents, a heating, ventilation, and air-conditioning (HVAC) system or the like), spurious noises (e.g., typing, rustling of papers, opening of chip bags or other food containers, etc.), or other non-human noise (e.g., sounds from audio/visual equipment, electronic devices, etc.); non-voice human noise (e.g., sneezing, coughing, chewing, etc.); and human voice noise (e.g., side comments or conversations from non-participants or other persons present in the environment 100, audio from remote participants playing on an audio speaker in the environment 100, etc.). Such unwanted sounds may also be captured in the audio signals produced by the microphone 102.

Though only one microphone 102 is shown in FIG. 1, the microphone 102 can include one or more of an array microphone, a non-array microphone (e.g., directional microphones such as lavalier, boundary, etc.), or any other type of audio input device capable of capturing speech and other sounds. As an example, the microphone 102 may include, but is not limited to, SHURE MXA310, MX690, MXA910, and the like. The microphone 102 may be placed in any suitable location, including on a wall, ceiling, table, lectern, and/or any other surface in the environment 100, and may conform to a variety of sizes, form factors, mounting options, and wiring options to suit the needs of the particular environment. The exact type, number, and placement of microphone(s) in a particular environment may depend on the locations of audio sources, listeners, physical space requirements, aesthetics, room layout, stage layout, and/or other considerations.

As shown, the audio environment 100 also includes an audio coverage area 106 (also referred to herein as "audio pick-up region") that represents an accepted audio pick-up zone for the microphone 102. In particular, the audio coverage area 106 defines a region or space within which the microphone 102 can deploy or focus beamformed audio lobes 108 for capturing or detecting desired audio signals, such as sounds produced by the audio sources 104 located within the audio coverage area 106. For example, as shown in FIG. 1, a first audio pick-up lobe 108 (e.g., Lobe 1) may be deployed, or directed, towards a first audio source 104, and a second audio pick-up lobe 108 (e.g., Lobe 2) may be deployed, or steered, towards a second audio source 104 disposed on an opposite side of the microphone 102. In embodiments, the microphone 102 may be part of an audio system (such as, e.g., audio system 200 shown in FIG. 2) that is configured to define the audio coverage area 106 based on, for example, a known or calculated location of the microphone 102, known or expected locations of the audio sources 104, and/or real-time locations of the audio sources 104.

While FIG. 1 shows a specific configuration for the environment 100, it should be appreciated that other configurations are contemplated and possible, including, for example, different arrangements of the audio sources 104, audio sources that move about the room, different arrangements of the audio coverage area 106, different locations for the microphone 102, a different number of audio sources, microphones, and/or audio coverage areas, etc.

The environment 100 may also include one or more other audio sources 110 that are located outside the audio coverage area 106, for example, as shown in FIG. 1. The other audio sources 110 (also referred to herein as "out-of-coverage audio sources") may be human speakers or talkers located at or near a periphery of the audio coverage area 106, or close enough that sounds produced by the other audio sources 110 may also be detected by the lobes 108 deployed within the audio coverage area 106. The sounds produced by the out-of-coverage audio sources 110 may be unwanted speech audio or other human voice noise, such as side comments, conversations, or other speech that is not part of the conference call or other event being captured by the audio coverage area 106.

In some cases, an audio fence 112 may be formed around the audio coverage area 106 in order to prevent or block unwanted sounds produced by the out-of-coverage audio sources 110 from entering the desired audio output (e.g., mix of the audio signals captured inside the audio coverage area 106). For example, the audio fence 112 may be formed by defining additional audio coverage areas 114 (or "outer coverage areas") around the periphery of the preferred audio coverage area 106 and muting the lobes deployed in the outer coverage areas 114 so that the audio signals captured outside the audio coverage area 106 are not included in the desired audio output. Even still, unwanted sounds produced by the out-of-coverage audio sources 110 may bleed or leak into the audio signals captured by the in-coverage-area lobes 108, e.g., as off-axis noise, and thus, may still be present or audible in the desired audio output. For example, during double-talk scenarios where one of the desired audio sources 104 (e.g., talker A) is speaking at the same time as one of the out-of-coverage audio sources 110 (e.g., talker B), sounds produced by talker B may be inadvertently picked up by the same lobe 108 that is deployed towards talker A due to acoustic leaking.

In various embodiments, the microphone 102 can be configured to further minimize, or remove, unwanted acoustic leaking by deploying additional audio pick-up lobes 116 that are configured to capture unwanted sounds produced outside the audio coverage area 106. In particular, the additional lobes 116 (or "outer lobes") can be directed towards the out-of-coverage audio sources 110, or other locations outside the audio coverage area 106. For example, as shown in FIG. 1, a first additional lobe 116 (e.g., Lobe 4) may be deployed towards a first out-of-coverage audio source 110 in order to capture sounds produced by Talker B, and a second additional lobe 116 (e.g., Lobe 5) may be deployed towards a second out-of-coverage audio source 110 in order to capture sounds (e.g., clapping) produced by the second source 110. The unwanted audio signals captured by the additional lobes 116 can be provided to a source remover (e.g., source remover 306 of FIG. 3) included in the audio system to remove off-axis noise due to acoustic bleeding, or unwanted sounds leaking into the desired audio output. As described herein and shown in FIGS. 3-5, the source remover may calculate a mask based on the unwanted audio signals captured outside the audio coverage area 106, as well as the desired audio signals captured inside the audio coverage area 106, and apply the mask to the desired audio signals in order to minimize or remove the effects of unwanted acoustic bleeding in the desired audio output.

Figure 2:
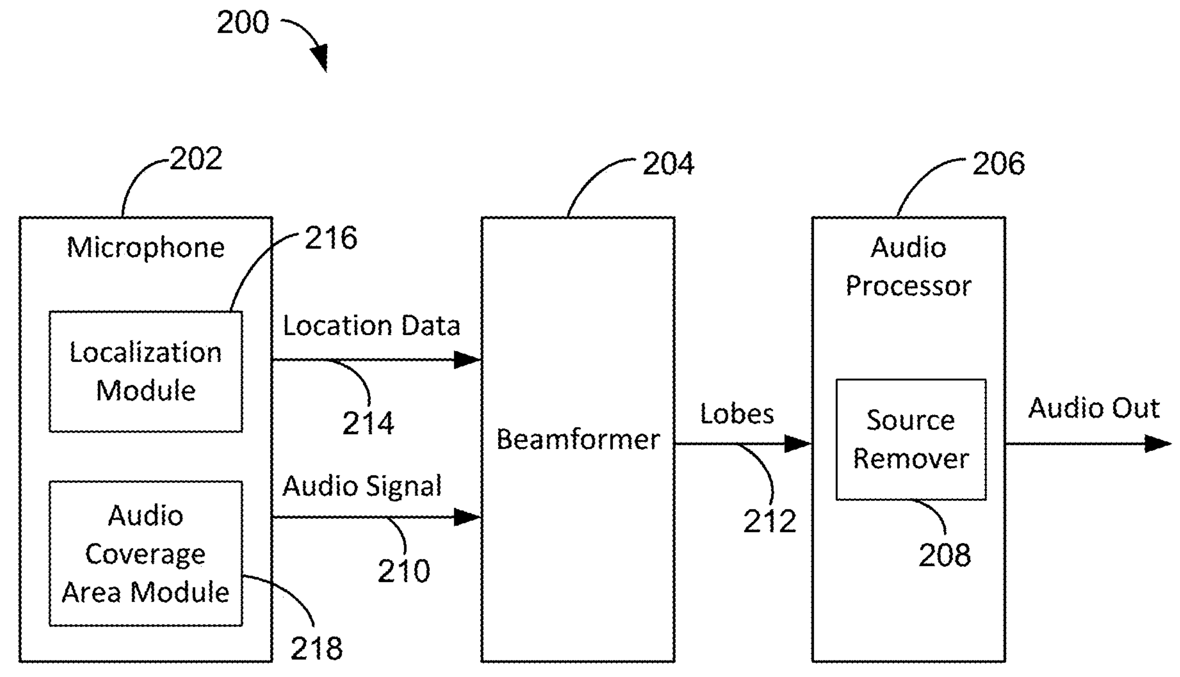
FIG. 2 is a schematic diagram of an exemplary audio system, in accordance with one or more embodiments.

Referring additionally to FIG. 2, shown is an exemplary audio system 200 configured to remove off-axis noise from a desired audio output by implementing one or more of the techniques described herein, in accordance with embodiments. As shown, the audio system 200 (also referred to herein as "system") comprises a microphone 202, a beamformer 204 communicatively coupled to the microphone 202, and an audio processor 206 communicatively coupled to the beamformer 204 and comprising a source remover 208. The audio system 200 may be utilized in environments like the environment 100, for example, to facilitate communication with persons at a remote location and/or for audio reinforcement at the same location, in addition to improving a signal quality of the audio output. For example, the microphone 202 may be the same as, or substantially similar to, the microphone 102 of FIG. 1 and may be used to capture sounds from one or more of the audio sources 104 and/or 110 shown in FIG. 1.

In general, the microphone 202 is configured to detect sound from an audio source in an environment, and convert the sound into an audio signal. Though only one microphone is shown in FIG. 2, the audio system 200 may work in conjunction with any type and any number of microphones 202, including one or more microphone transducers (or elements), one or more microphone arrays, one or more directional microphones, or any combination thereof. In embodiments, the microphone 202 generates a plurality of audio signals 210 based on the captured sounds and provides the audio signals 210 (also referred to herein as "detected audio signals") to the beamformer 204.

The beamformer 204 can be configured to process the audio signals 210 and based thereon, generate one or more beamformed audio signals 212, or otherwise direct an audio pick-up beam, or microphone lobe, towards a particular location in the environment (e.g., as shown by lobes 108 in FIG. 1). In this manner, the microphone 202, in conjunction with the beamformer 204, can be configured to deploy or point microphone lobes towards various locations, or at various angles relative to the microphone 202. The beamformer 204 may be further configured to provide the one or more beamformed audio signals 212 (or "lobe signals") to the audio processor 206 for further processing and mixing, as described herein. The beamformer 204 may include any type of beamforming algorithm or other beamforming technology configured to deploy or place microphone lobes, including, for example, a delay and sum beamforming algorithm, a minimum variance distortionless response ("MVDR") beamforming algorithm, and more. Though FIG. 2 shows the beamformer 204 a separate or standalone device communicatively coupled to the microphone 202, in other embodiments, the beamformer 204 may be included in the microphone 202, the audio processor 206, or other component of the audio system 200.

Figure 3:
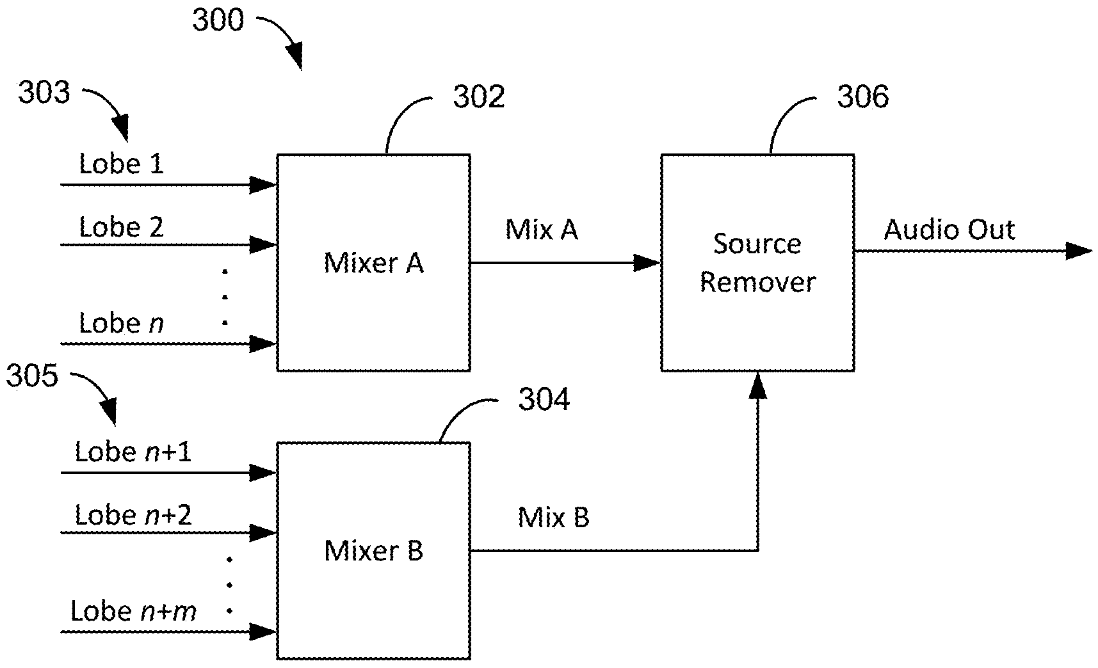
FIG. 3 is a schematic diagram of an exemplary audio processor that may be included in the system of FIG. 2, in accordance with one or more embodiments.

When multiple microphone lobes are formed, the beamformer 204 may include a plurality of audio channels (not shown), and each channel may be assigned to a respective lobe for individually receiving and processing the audio signals corresponding to that lobe. For example, the microphone 202 can be configured to provide each of the plurality of audio signals 210 to a respective one of a plurality of audio channels at the beamformer 204. Likewise, the audio processor 206, and/or each component thereof, may be configured to include a plurality of audio channels for respectively receiving the lobe signals 212 output by the beamformer 204, for example, as shown in FIG. 3. Other components of the audio system 200 may also include a plurality of channels respectively assigned to the plurality of audio channels of the microphone 202 in order to allow individual processing and/or handling of the audio signals 210 and/or lobe signals 212, as will be appreciated.

For ease of explanation, the techniques described herein may refer to using the plurality of audio signals 210 captured by the microphone 202, even though the techniques may utilize any type of acoustic source, including beamformed audio signals 212 generated by the beamformer 204. In addition or alternatively, the plurality of audio signals 210 captured by the microphone 202 may be converted into the frequency domain, in which case, certain components of the audio system 200 may operate in the frequency domain.

In some embodiments, the microphone 202 and/or the beamformer 204 are configured to generate up to eight microphone lobes and thus, have at least eight audio channels. Other numbers of channels/lobes (e.g., twelve, six, four, etc.) are also contemplated, as will be appreciated. In some embodiments, the total number of lobes may be fixed (e.g., at eight). In other embodiments, the number of lobes may be selectable by a user and/or automatically determined based on the locations of the various audio sources detected by the microphone 202. Similarly, in some embodiments, a directionality and/or location of each lobe may be fixed, such that the lobes always form a specific configuration. In other embodiments, the directionality and/or location of each lobe may be steerable or selectable based on a user input and/or automatically in response to, for example, detecting a new audio source, movement of a known audio source to a new location, or re-deploying or resetting an existing lobe.

In various embodiments, the microphone 202 and/or the beamformer 204 may include an automatic lobe deployer ("ALD") configured to automatically deploy or place a microphone lobe in the direction of a detected audio source, which may include, for example, deploying a new lobe based on newly detected audio activity, repositioning an existing lobe to a newly detected location of a known audio source, or resetting an existing lobe to an initial lobe location. Exemplary embodiments of an audio system configured to use automatic lobe deployment techniques is disclosed in co-assigned U.S. Pat. No. 11,438,691, the contents of which are incorporated by reference herein in its entirety.

In some embodiments, the microphone 202 may be configured to use a general or non-directional lobe to detect audio, and upon detecting an audio signal at a given location, the microphone 202 and/or the beamformer 204 may deploy a directed lobe towards the given location for capturing the detected audio signal. In other embodiments, the audio system 200 may not include a beamformer, in which case each of the audio signals 210 captured by the microphone 202 may be provided directly to the audio processor 206. For example, the microphone 202 may include a plurality of omnidirectional microphones, each configured to capture audio signals 210 using an omnidirectional lobe. In such cases, the plurality of audio signals 210 may still be provided to respective audio channels associated with the audio system 200.

In various embodiments, the beamformer 204 uses location data 214 obtained from the microphone 202 to determine appropriate lobe placement for optimally capturing the audio sources detected by the microphone 202. The location data 214 (also referred to as "sound localization data") can indicate a position of the detected audio source relative to the microphone 202. The microphone 202 can be configured to generate the location data 214 using a localization module 216 that is included in the microphone 202, as shown in FIG. 2, or one or more other components of the audio system 200. In embodiments, the localization module 216 comprises an algorithm or other software configured to generate a localization of a detected sound or audio source, and determine coordinates (also referred to herein as "localization coordinates") that represent a location or position of the detected audio source relative to the microphone 202. Various methods for generating sound localizations are known in the art, including, for example, generalized cross-correlation ("GCC") and others.

The localization coordinates generated by the localization module 216 may be included in the location data 214 provided to the beamformer 204. The localization coordinates may be Cartesian or rectangular coordinates that represent a location point in three dimensions, or x, y, and z values. In some cases, the localization coordinates may be converted to polar or spherical coordinates, i.e. azimuth (phi), elevation (theta), and radius (r), for example, using a transformation formula, as is known in the art. The spherical coordinates may be used in various embodiments to determine additional information about the audio system 200, such as, for example, an angular separation or distance between the audio source and the microphone 202, which may be used to configure one or more aspects of a given audio coverage area and/or used by the source remover to optimize noise removal, as described herein.

In various embodiments, the audio system 200 comprises an audio coverage area module 218 configured to set up and/or configure one or more audio coverage areas for capturing sounds from desired audio sources. The audio coverage area module 218 may be included in the microphone 202, as shown in FIG. 2, or one or more other components of the audio system 200. Like the audio coverage area 106 shown in FIG. 1, each audio coverage area represents an audio pick-up zone, or other region or space within which the microphone 202 can deploy lobes for detecting audio. The audio coverage area module 218 can be configured to determine a size, shape, and location of each audio coverage area based on where the audio sources are located, or expected to be located, in the environment, whether the audio sources are seated, standing, or moving about the environment, and/or other relevant information about the environment itself (e.g., locations of other audio devices; vents, HVAC systems, or other noise sources; furniture or other objects; etc.). For example, in a typical conference room that has a plurality of chairs disposed around a table, the audio coverage area module 218 may place an audio coverage area over the chairs and/or table in order to create a sound zone that focuses audio pick-up on any human speakers seated at the table.

In some embodiments, the audio coverage area module 218 can be configured to automatically configure an audio coverage area based on actual or real-time locations of the audio sources, for example, as provided by, or determined based on, the location data 214 generated by the localization module 216. In such cases, the audio coverage area module 218 may be configured to select an initial set of boundaries for a given audio coverage area based on initial audio source locations obtained from the localization module 216. Upon receiving new location data 214 indicating that the audio source locations have moved or changed, the audio coverage area module 218 may be configured to dynamically adjust the boundaries of the audio coverage area to encompass or cover the new audio source locations. Exemplary embodiments of an audio system configured to automatically define or configure audio coverage areas based on real-time audio source locations are disclosed in co-assigned U.S. patent application Ser. No. 18/151,346, filed Jan. 6, 2023 and entitled, "System and Method For Automatic Setup of Audio Coverage Area," the contents of which is incorporated by reference herein in its entirety.

Once the audio coverage area module 218 has completed set up of an audio coverage area, the audio coverage area module 218 may output information about the audio coverage area, such as, for example, location coordinates or other information outlining the covered region or otherwise defining the boundaries of the coverage area, to the microphone 202 and/or the beamformer 204. Based on the received coverage information, the beamformer 204 can be configured to implement the audio coverage area by deploying or directing audio pick-up lobes towards the region defined by the coverage information, or more specifically, towards the specified location coordinates.

The audio processor 206 can be any type of processor capable of combining the desired audio signals received from the beamformer 204 to generate a mixed audio output (or "desired audio mix") and using the source remover 208 to remove off-axis noise from the mixed audio output, or otherwise implementing the techniques described herein. In various embodiments, the audio processor 206 may be an audio signal processor, a digital signal processor ("DSP"), a digital signal processing component that is implemented in software, or any combination thereof. In some embodiments, the audio processor 206 may be, or may be included in, an aggregator configured to aggregate or collect data and/or audio from various components of the audio system 200 and apply appropriate processing techniques to the collected data and/or audio in accordance with the techniques described herein.

In various embodiments, the audio processor 206 can be configured to receive, at respective audio channels, beamformed audio signals 212 (or "lobe signals") corresponding to each of the lobes deployed by the beamformer 204. As described herein, the audio pick-up lobes deployed in a given environment can include in-coverage-area lobes configured to pick-up sounds (or "desired audio") produced by audio sources located within a selected audio coverage area (such as, e.g., inner lobes 108 deployed within the audio coverage area 106 in FIG. 1), as well as out-of-coverage lobes configured to pick-up sounds (or "unwanted audio") produced by audio sources located outside the selected audio coverage area (such as, e.g., outer lobes 116 deployed outside the audio coverage area 106 in FIG. 1). Accordingly, the audio processor 206 may include a plurality of input audio channels for receiving the desired audio signals captured by, or otherwise associated with, the in-coverage-area lobes (e.g., speech from audio sources 104 in FIG. 1) and one or more reference audio channels for receiving the unwanted audio signals captured by, or otherwise associated with, the out-of-coverage lobes (e.g., sounds from audio sources 110 in FIG. 1). By separating the lobe signals 212 into separate channels, the audio processor 206 can be configured to create a desired audio mix comprised of the in-coverage-area audio signals and a noise mix comprised of the out-of-coverage audio signals, and use the noise mix, via the source remover 208, to remove off-axis noise from the desired audio mix, as described herein.

Referring additionally to FIG. 3, shown is an exemplary audio processor 300 that may be used to implement the audio processor 206 shown in FIG. 2, in accordance with embodiments. The audio processor 300 comprises a first audio mixer 302 (e.g., Mixer A) for generating a desired audio mix (e.g., Mix A) using in-coverage audio signals 303, or the audio signals captured by desired or inner lobes (e.g., Lobe 1 to n) deployed within an active audio coverage area. The audio processor 300 further comprises a second audio mixer 304 (e.g., Mixer B) for generating a noise mix (e.g., Mix B) using out-of-coverage audio signals 305, or the audio signals captured by additional or outer lobes (e.g., Lobes n+1 to n+m) deployed outside the active audio coverage area. The audio processor 300 further comprises a source remover 306 for removing off-axis noise from the desired audio mix by applying, to the desired audio mix, a mask determined based on the noise mix. The source remover 306 may be the same as, or similar to, the source remover 208 shown in FIG. 2.

Though FIG. 3 shows them as separate components, in other embodiments, any of the first audio mixer 302, the second audio mixer 304, and/or the source remover 306 may be combined into a single component of the audio processor 300. In still other embodiments, certain components of the audio processor 300 may be separately included in other devices, such as, for example, the microphone 202 of FIG. 2, or a computing device of the audio system 200.

The first audio mixer 302 (also referred to herein as "first mixer") can be an automixer, audio mixing module, or any other type of mixer configured to generate a mixed audio signal that conforms to a desired mix of the in-coverage audio signals 303 obtained by the inner lobes (e.g., Lobe 1 to n). For example, the desired mix may be obtained by emphasizing the audio signals 303 from certain lobes deployed within the audio coverage area, and/or de-emphasizing or suppressing audio signals 303 from other lobes deployed in the audio coverage area. Exemplary embodiments of audio mixers are disclosed in commonly-assigned patents, U.S. Pat. Nos. 4,658,425, 5,297,210, and 11,302,347, each of which is incorporated by reference in its entirety herein. As shown in FIG. 3, the first audio mixer 302 may include a plurality of input audio channels for respectively receiving the plurality of in-coverage audio signals 303 and an output audio channel for providing the mixed audio signal (or "desired audio mix") to the source remover 306. In general, each of the input audio channels may be gated on (e.g., allowed with little or no suppression) or gated off (e.g., suppressed or attenuated) depending on whether the contributions of that channel, or the audio signal 303 captured by the corresponding lobe, have been selected for inclusion in the desired audio mix. For example, an input audio channel may be gated off if the corresponding audio signal 303 contains noise audio, or does not contain speech audio. In this manner, the first audio mixer 302 can be configured to generate the desired audio mix using only the contributions of the desired input audio channels, while excluding all other channels.

The second audio mixer 304 (also referred to herein as a "second mixer" or "noise mixer") can be any type of summer or other mixer for combining, or summing together, the out-of-coverage audio signals 305, or otherwise generating a mix of the sounds captured by the outer lobes (e.g., Lobes n+1 to n+m) deployed outside the active audio coverage area. As shown in FIG. 3, the second audio mixer 304 may include a plurality of input audio channels for respectively receiving the out-of-coverage audio signals 305 and an output audio channel for providing the resulting noise mix (or "out-of-coverage mix") to the source remover 306.

Figure 4:
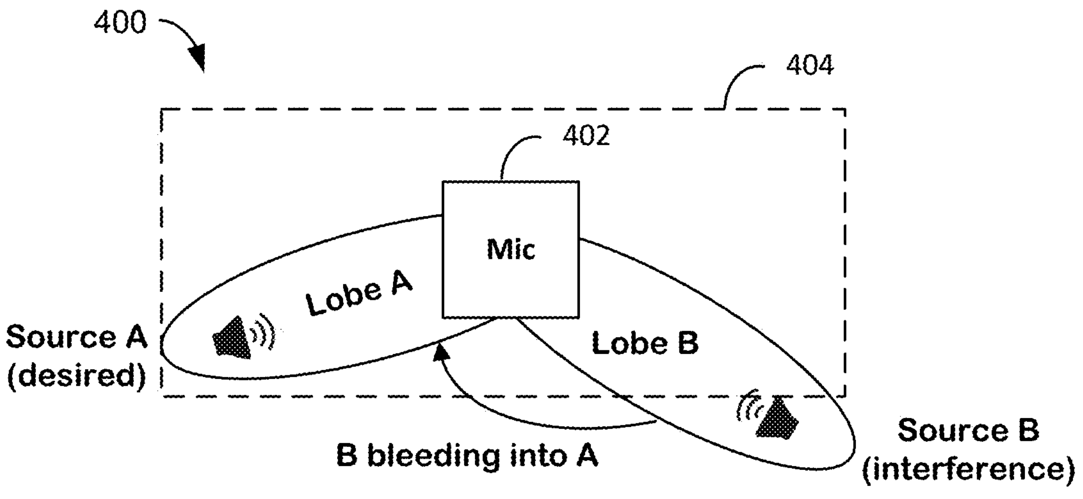
FIG. 4 is a schematic diagram of an exemplary environment with lobes deployed by a microphone of the system of FIG. 2.

Referring additionally to FIG. 4, shown is an example of acoustic bleeding or leaking in an environment 400 comprising a microphone 402 (e.g., similar to microphone 202), a first sound source (e.g., Source A) located within an audio coverage area 404, and a second audio source (e.g., Source B) located outside the audio coverage area 404. As illustrated, acoustic bleeding occurs when sounds produced by Source B (e.g., speech or other human noises) are audible in an audio signal captured by a first microphone lobe (e.g., Lobe A) directed towards Source A, even though Source B falls outside the audio coverage area 404. For example, a desired audio mix generated using only the audio signals captured by Lobe A, or otherwise inside the audio coverage area 404, may still include, as off-axis noise, sounds from Source B.

According to embodiments, the source remover 306 can leverage the directivity of the microphone 402 (or its microphone lobes) to remove off-axis noise from the desired audio mix. In particular, the microphone 402 can be configured to deploy a second microphone lobe (e.g., Lobe B) towards Source B, or other audio source located outside the audio coverage area 404, and provide the sounds captured by Lobe B (e.g., out-of-coverage signals 305) to the source remover 306 for removing off-axis noise from the desired or in-coverage audio signals 303. The source remover 306 can be configured to generate a mask based on the audio signals 305 captured by the out-of-coverage lobes, or the noise mix generated by the second audio mixer 304, and apply that mask (or "noise mask") to the desired audio mix generated based on the audio signals 303 captured by the in-coverage lobes. In this manner, off-axis noise stemming from the out-of-coverage signals 305 may be removed from the desired audio mix.

In various embodiments, the source remover 306 may be configured to calculate the mask (or mask value) using a ratio of the desired audio mix to the noise mix, and multiply the desired audio mix by the mask value to obtain a modified audio output without off-axis noise. The mask may have any value in the range of about zero (i.e. full mask is applied) to about one (i.e. no mask is applied). The source remover 306 may also be configured to adjust an aggressiveness of the mask, or how completely a source (e.g., noise) is removed from the desired audio mix. In addition, in some cases, the amount of removal applied to certain frequency bands of the desired audio mix can be tailored according to a known beamforming rejection at those frequency bands. In some embodiments, the source remover 306 can be used to achieve source separation, in addition to, or instead of, removing the out-of-coverage audio sources from the output of the microphone 202. These and other aspects of the mask will be described in more detail below in accordance with exemplary embodiments. However, it should be appreciated that other embodiments may use other types of masks and/or any other combination of the techniques described herein, to remove off-axis noise from the microphone output.

Figure 5:
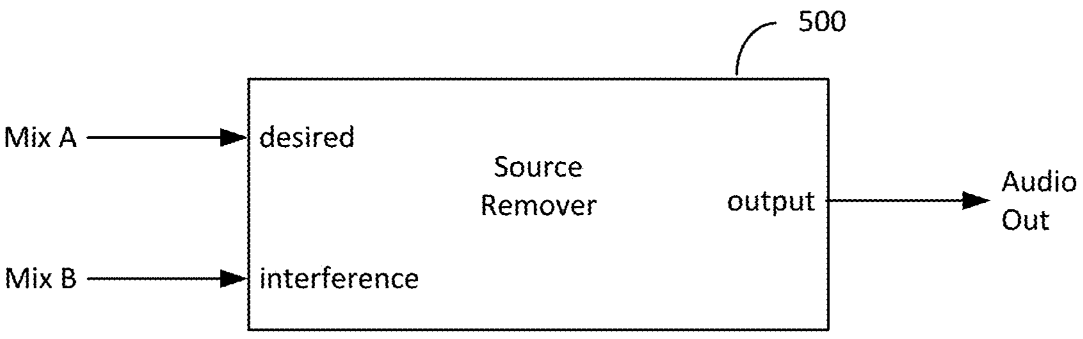
FIG. 5 is a schematic diagram of an exemplary source remover that may be included in the audio processor of FIG. 3, in accordance with one or more embodiments.

Referring now to FIG. 5, shown is an exemplary source remover 500 that may be used to implement any of the source removers described herein, including the source remover 208 of FIG. 2 and/or the source remover 306 of FIG. 3, in accordance with embodiments. The source remover 500 can be configured to remove, from a desired signal, d, off-axis noise resulting from a interference signal, r, bleeding into the desired signal. The desired signal may be, for example, Mix A of FIG. 3, or any other mix of audio signals captured using lobes deployed within an audio coverage area (e.g., area 404 of FIG. 4), and the interference signal may be, for example, Mix B from FIG. 3, or any other mix of audio signals captured using lobes deployed outside the audio coverage area. As shown, the source remover 500 includes a first input for receiving the desired signal, a second input for receiving the interference signal, and an output for providing a corrected or modified version of the desired signal, dr, such as, e.g., Mix A with off-axis noise due to Mix B removed.

In various embodiments, the source remover 500 can be configured to take a ratio of d to r and apply the ratio d/r as a gain, or "mask," to the desired signal, d, to obtain the corrected signal dr. In other words, at a given time, n, the source remover 500 can remove off-axis noise in the desired signal due to acoustic bleeding of the interference signal by using a noise removal formula, such as Equation 1:

$$dr[n] = d[n]*(d[n]/r[n]) = d[n]*m[n], \quad (1)$$

where m is a mask value equal to d/r. According to embodiments, the mask value m may be capped at one (i.e. no mask is applied) and floored at zero (i.e. full mask is applied). In addition, the source remover 500 may obtain a squared norm of the desired signal and of the interference signal for use as the d and r values, respectively, in the noise removal formula.

In some embodiments, the source remover 500 may be configured to operate in the frequency domain, e.g., like the other components of the audio system 200. In such cases, the noise removal formula may be applied to individual bins of a Fast Fourier Transform (FFT) of the audio signals. For example, the source remover 500 may be configured to calculate a plurality of mask values, or gains, based on select frequency bands (or "sub-bands) of the audio signals and respectively apply the mask values to corresponding bins of the FFT. In some cases, the source remover 500 may be configured to apply the mask to each bin of the FFT, for example, by calculating N mask values for an FFT having a total of N bins. In other cases, the source remover 500 may be configured to apply the mask to only the positive frequency bins of the FFT, for example, by calculating N/2+1 mask values for the N/2+1 positive frequency bins in the FFT, as will be appreciated.

When operating in the frequency domain, each bin used by the source remover 500 has an associated "crossover" threshold, c, that defines the point where the mask switches between positive gain and negative gain. For example, in a given sub-band, if d equals g*r, then the desired-to-reference ratio (i.e. d/r) is equal to g, and pre-multiplying the mask by 1/g ensures a mask value of 1, or 0 decibels (dB). In such cases, since g is the point where the mask switches between positive gain and negative gain, the crossover threshold c can be set to 1/g, and the mask value, m, can be set to c*(d/r). Thus, the above noise removal formula, dr[n]=d[n]*m[n] (or Equation 1), becomes as shown by Equation 2:

$$dr[n] = d[n]*c*(d[n]/r[n]) = d[n]*(1/g)*(d[n]/r[n]). \quad (2)$$

In embodiments, the crossover threshold c and/or its denominator g can be pre-determined or set during tuning or setup, for example, by an operator of the audio system 200. In some cases, the crossover threshold may be adaptive depending on one or more criteria, such as, for example, room size, desired gain amount, reverberations in the environment, relative sound levels during times of quiet, and more.

In general, the noise removal formula causes the source remover 500 to output a corrected microphone signal dr that is attenuated, as compared to a desired signal d (or desired audio mix), when the mask value m is less than unity, for example, due to the desired signal d dropping to less than g times higher than the interference signal r. In some embodiments, the crossover threshold c can be configured to have a more significant and/or tailored impact on the performance of the source remover 500, for example, in order to adjust the mask based on known beamforming rejection criteria. In one embodiment, the source remover 500 is configured to set g, or the denominator of the crossover threshold c, to a value of one for the lowest frequency band and to a value of thirty-two or higher for higher frequency bands, with a gradient of values therebetween. For example, the g value may be configured to smoothly or evenly transition from 1 to 32 for frequencies in the 0 to 9 kilohertz (kHz) range, where human speech is likely to be present, and from 32 to 1000 for frequencies in the 9 kHz to 24 kHz range, where speech is not likely to be present, but noise may still be present. Thus, the mask can be tailored to be more aggressive, or provide more attenuation, in the bandwidths that are not likely to contain speech audio. In other embodiments, the source remover 500 may be tailored according to other frequency bands and/or other ranges of the desired audio mix.

In some embodiments, the source remover 500 is configured to scale an aggressiveness of the noise removal from 0% (or no removal) to 100% (or full removal) by applying an aggressiveness scalar, x, to the mask value m. For example, the scalar x may be configured to have a value selected from a range of zero to one, and a modified mask value, y, may be calculated using Equation 3:

$$y = (1 - m) * x + m. \tag{3}$$

In such cases, the modified mask value may be applied to the desired signal d to obtain the corrected microphone output dr, i.e. using Equation 4:

$$dr = d * y = d((1 - m) * x + m). \tag{4}$$

As will be appreciated, when the scalar x equals zero, the modified mask value y becomes equal to the mask value m and thus, the full mask is applied to the desired signal d (i.e. dr=d*m). And when the scalar x equals one, the modified mask value y becomes one, meaning the gain is set to one and no mask is applied to the desired signal d (i.e. dr=d). In some cases, the scalar x may be automatically selected by the source remover 500. In other cases, the scalar x may be a user-selected value that is provided to the source remover 500 via a user interface of the audio processor 206 or other data input device of the audio system 200. In one exemplary embodiment, the user inputs a value v between zero and one, and the source remover 500 is configured to flip the value v using the formula x=1−v, so that a user input of "0" means no removal and a user input of "1" means full removal, when applied to the mask value m.

In other embodiments, the aggressiveness of the mask may be scaled by raising the mask value m to an exponent. In such cases, the exponent may be another aggressiveness scalar s, and the modified mask value may be equal to ms. Since the mask value m is a value less than or equal to one, the aggressiveness of the mask may be increased by setting the scalar s to a value above one and may be decreased by setting the scalar s to a value below one.

In some embodiments, the aggressiveness of the source removal techniques described herein, or how completely a given source is removed from the audio output, may be tuned by adjusting a signal power of the interfering signal (e.g., r) before the signal is received by the source remover. For example, the audio processor 300 may further include an amplifier or the like (not shown) that is located outside the source remover 306 and is configured to amplify, or attenuate, the interfering signal (e.g., Mix B) based on a desired aggressiveness for the source remover. The desired aggressiveness may be set by the user, for example, via a user input, or automatically determined by the audio processor 300 based on gating decisions and the geometry of the sound sources, for example. In some embodiments, the desired aggressiveness may be an input value that adjusts a gain setting of the amplifier based on the amount of amplification or attenuation needed to achieve the desired level of aggressiveness for the source remover.

Though the source remover is primarily described herein as operating in the frequency domain, in other embodiments, the source remover, and the rest of the audio system, may be configured to operate in the time domain. In such cases, the noise removal formula may be applied to the entire frequency band of the audio signals, for example, by calculating a single mask value for the full bandwidth (e.g., 0 to 24 kilohertz (kHz) for a 48 kHz sample rate), and the other techniques described herein may be modified accordingly, as will be appreciated.

In some embodiments, noise removal by the source remover 500 may be most or more effective when an angular separation between the interference source and the speech source is within a predetermined range, such as, e.g., 90 to 180 degrees, or 120 to 180 degrees, etc. If the interference source and the speech source are too close together, for example, when the angular separation is significantly less than the predetermined range (e.g., less than 90 degrees, less than 45 degrees, less than 30 degrees, etc.), the source remover 500 may have difficulty distinguishing one source from the other. In such cases, the source remover 500 may be configured to increase the aggressiveness of the source remover 500, e.g., via the scalar x, to compensate for the minimal separation.

The source removal techniques described herein can be used for removal of out-of-coverage sounds from audio signals captured within an audio coverage area of a conference room or other environment with multiple participants positioned at multiple microphones, or in any other noisy environment. In some embodiments, the source remover 500 can also be configured to achieve source separation, or isolation, for the audio signals received from the microphone 202. For example, using the techniques described herein, the source remover 500 can separate a first audio signal corresponding to a first audio source from a second audio signal corresponding to a second audio source, i.e. remove the second audio signal from the first audio signal, and vice versa.

Figure 6:
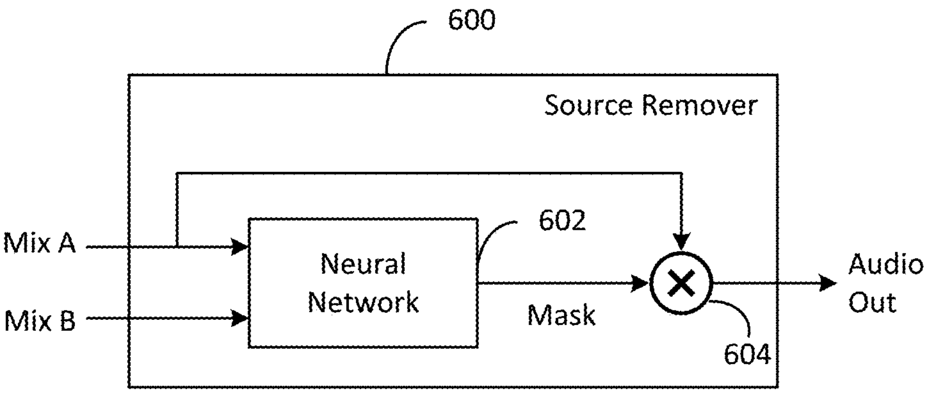
FIG. 6 is a schematic diagram of another exemplary source remover that may be included in the audio processor of FIG. 3, in accordance with one or more embodiments.

FIG. 6 illustrates another exemplary source remover 600 that may be used to implement any of the source removers described herein, in accordance with embodiments. Like the source remover 500 shown in FIG. 5, the source remover 600 includes a first input for receiving a desired signal, d, such as, e.g., Mix A of FIG. 3 or other desired audio mix comprising sounds captured by lobes deployed within an audio coverage area; a second input for receiving an interference signal, r, such as, e.g., Mix B of FIG. 3 or other noise mix comprising sounds captured by lobes deployed outside the audio coverage area; and an output for providing a corrected or modified version of the desired signal, dr, such as, e.g., Mix A with off-axis noise due to Mix B removed. Also like the source remover 500, the source remover 600 can be configured to remove, from the desired signal, d, off-axis noise resulting from the interference signal, r, bleeding into the desired signal by calculating a mask, m, based on the interference signal and applying the mask to the desired signal.

Unlike the source remover 500, however, the source remover 600 comprises a neural network 602 for calculating the mask, m, based on the input desired signal and the input interference signal. The source remover 600 also comprises a multiplier 604 or other similar component for applying the mask to the desired signal (or Mix A), as shown. When operating in the frequency domain, the input desired signal may include sub-band energies from the inner lobes, the input interference signal may include sub-band energies from the outer lobes, and the neural network 602 may output the mask as a corresponding plurality of sub-band gains (e.g., N gains for N frequency bins, etc.) to be applied to respective sub-band energies of the input desired signal, as described herein. According to embodiments, the neural network 602 may be implemented using any type of neural network, including, for example, convolutional neural networks ("CNN"), recurrent neural networks ("RNN"), or any combination thereof.

In various embodiments, the neural network 602 can be configured to calculate appropriate mask values for the input signals based, at least in part, on one or more coefficients obtained by the neural network 602 during a training phase. For example, the neural network 602 may be trained using sample audio signals captured by various pairs of microphone lobes, each pair including an inner lobe directed inside an audio coverage area in the environment and an outer lobe directed outside the audio coverage area. During the training phase, the neural network 602 may be configured to test different values for one or more of the parameters that are used to calculate the mask until it identifies a set of parameter values which correspond to a mask that, when applied to the desired signal, produces an output that closely resembles the original desired signal. This set of parameter values may be saved in a memory of the neural network 602 and/or source remover 600 as the one or more coefficients, and may be retrieved by the neural network 602 during normal or real-time use of the source remover 600.

In some embodiments, the source remover 306 shown in FIG. 3 may be implemented using a combination of the source remover 500 of FIG. 5 and the source remover 600 of FIG. 6. For example, both source removers 500 and 600 may be independently operated to generate respective masks (e.g., m1 and m2), and a final mask, m, may be determined based on the two masks m1 and m2, for example, by selecting a minimum of the two, taking an average of the two, or any other suitable technique. Other techniques for combining the two source removers 500 and 600 are also contemplated.

Figure 7:
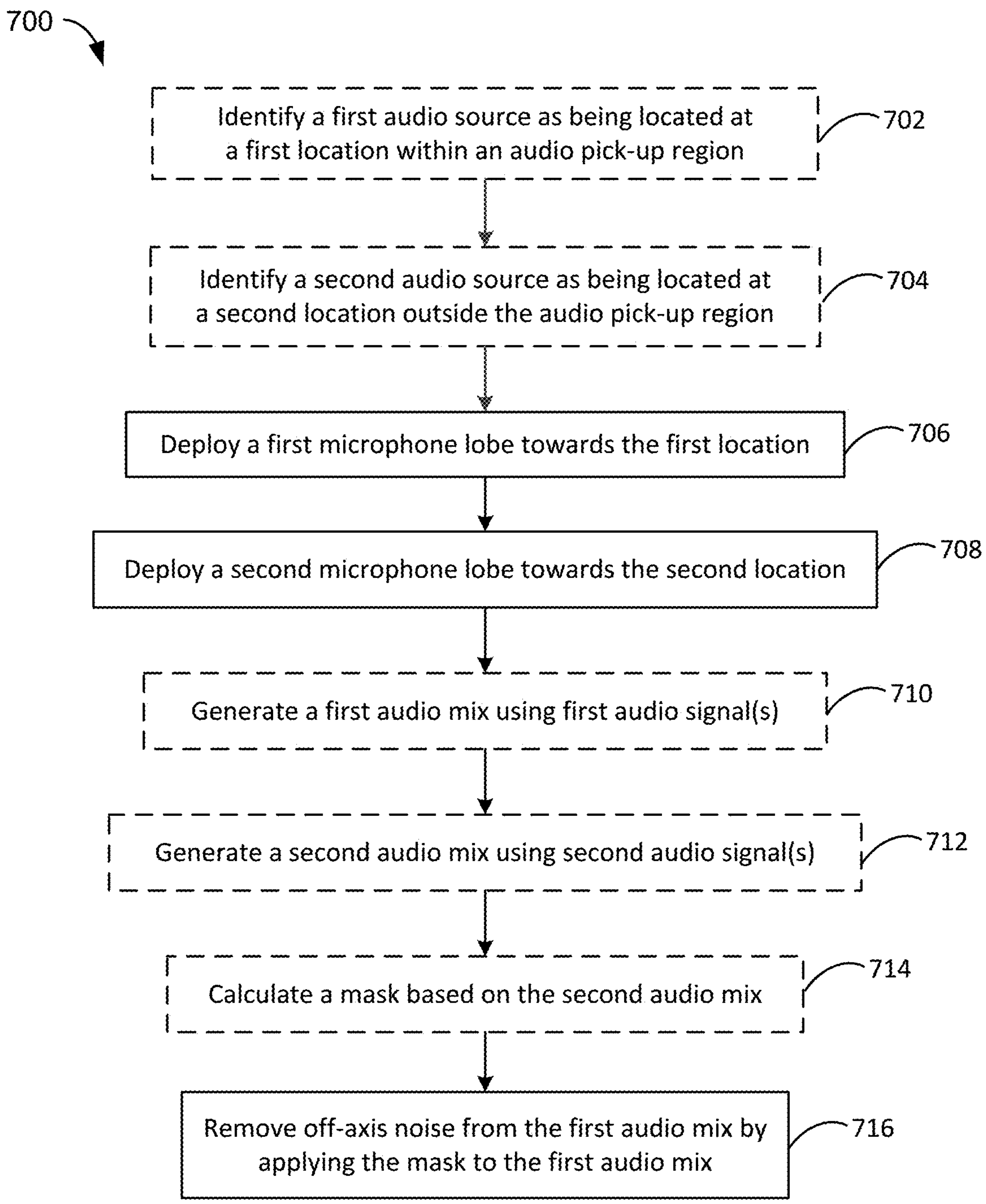
FIG. 7 is a flowchart illustrating exemplary operations for removing unwanted audio from a desired audio signal using the system of FIG. 2, in accordance with one or more embodiments.

Referring now to FIG. 7, shown is an exemplary method or process 700 comprising operations for removing, from a desired audio signal, off-axis noise caused by audio sources located outside an audio coverage area, in accordance with embodiments. The process 700 may be implemented using at least one processor in communication with at least one microphone, or otherwise using an audio system. For ease of explanation, the process 700 will be described below with reference to the audio system 200 of FIG. 2, including microphone 202, and/or the audio processor 300 of FIG. 3, including source remover 306, though it should be appreciated that the process 700 may also be implemented using other audio systems, processors, or devices. In embodiments, one or more processors and/or other processing components within the audio system 200 may perform any, some, or all of the steps of process 700. For example, the process 700 may be implemented using a digital signal processing ("DSP") component having a plurality of audio channels for respectively receiving a plurality of audio signals captured by one or more microphones. The DSP component may be included in, or integral to, the one or more microphones (e.g., microphone 202 in FIG. 2), processors (e.g., audio processor 206 in FIG. 2) and/or one or more other components of the audio system. In some embodiments, the process 700 may be carried out by a computing device included in the audio system, or more specifically a processor of said computing device executing software stored in a memory. In some cases, the computing device may further carry out the operations of process 700 by interacting or interfacing with one or more other devices that are internal or external to the audio system 200 and communicatively coupled to the computing device. One or more other types of components (e.g., memory, input and/or output devices, transmitters, receivers, buffers, drivers, discrete components, etc.) may also be utilized in conjunction with the processors and/or other processing components to perform any, some, or all of the steps of process 700.

As shown in FIG. 7, the process 700 may begin at step 702 with identifying, using the at least one microphone, a first audio source (e.g., Talker A in FIG. 1) as being located at a first location within an audio pick-up region (e.g., audio coverage area 106 of FIG. 1). In various embodiments, step 702 also includes detecting an audio signal (e.g., audio signal 210 of FIG. 1) using the at least one microphone, identifying or locating an origin or source of the audio signal, for example, based on localization coordinates or other location data (e.g., location data 214 of FIG. 1) associated with the audio signal, and comparing the location of the audio signal to one or more boundaries of the audio pick-up region to determine that the source of the audio signal is located within the audio pick-up region.

At step 704, the process 700 may also include identifying, using the at least one microphone, a second audio source (e.g., Talker B in FIG. 1) as being located at a second location outside the audio pick-up region. In various embodiments, step 704 also includes detecting another audio signal (e.g., audio signal 210 of FIG. 1) using the at least one microphone, identifying or locating an origin or source of the other audio signal, for example, based on localization coordinates or other location data (e.g., location data 214 of FIG. 1) associated with that audio signal, and comparing the location of the other audio signal to one or more boundaries of the audio pick-up region to determine that the source of the other audio signal is located outside the audio pick-up region.

At step 706, the process 700 includes deploying, using the at least one microphone, a first microphone lobe (e.g., Lobe 1 of FIG. 1) towards the first location for capturing one or more first audio signals (e.g., in-coverage audio signals 303 in FIG. 1) from, or generated by, the first audio source. As an example, the one or more first audio signals may be speech or other desired audio produced by the first audio source inside the audio coverage area.

The process 700 also includes, at step 708, deploying, using the at least one microphone, a second microphone lobe (e.g., Lobe 4 of FIG. 1) towards the second location for capturing one or more second audio signals (e.g., out-of-coverage audio signals 305 in FIG. 3) from, or generated by, the second audio source. As an example, the one or more second audio signals may include unwanted speech and/or noise produced by the second audio source outside the audio coverage area.

In some embodiments, the process 700 also includes receiving, at the at least one processor, the one or more first audio signals associated with the first microphone lobe and the one or more second audio signals associated with the second microphone lobe, and providing said audio signals to a DSP component of the at least one processor and/or audio system for processing, as will be appreciated. In some embodiments, the process 700 may include deploying additional inner lobes, i.e. within the audio pick-up region, in order to capture sounds from other desired audio sources located within the audio pick-up region, for example, as shown by inner lobes 108 in FIG. 1. Likewise, in some embodiments, the process 700 may also include deploying additional outer lobes, i.e. outside the audio pick-up region, in order to capture sounds from other unwanted audio sources located outside the audio pick-up region, for example, as shown by outer lobes 116 in FIG. 1.

In various embodiments, the process 700 further includes, at step 710, generating, using the at least one processor, a first audio mix based on, or using, the one or more first audio signals captured within the audio pick-up region. For example, the first audio mix (e.g., Mix A in FIG. 3) may be a desired mix of the audio signals captured inside the audio coverage area and may be generated using an automixer or other audio mixer (e.g., first audio mixer 302 in FIG. 3) that is included in the at least one processor or otherwise communicatively coupled thereto.

The process 700 may also include, at step 712, generating, using the at least one processor, a second audio mix based on, or using, the one or more second audio signals captured outside the audio pick-up region. For example, the second audio mix (e.g., Mix B in FIG. 3) may be a noise mix comprised of all audio signals captured outside the audio coverage area and may be generated using an adder, audio mixer, or other appropriate device (e.g., second audio mixer 304 in FIG. 3) included in the at least one processor or otherwise communicatively coupled thereto.

As shown in FIG. 7, the process 700 may also include, at step 714, calculating a mask based on the second audio mix. For example, the mask may be calculated using a ratio of the first audio mix to the second audio mix. The process 700 further includes, at step 716, removing off-axis noise from the first audio mix by applying, to the first audio mix, the mask determined based on the second audio mix (i.e. at step 714). In embodiments, the mask may be calculated by a source remover included in the audio system (e.g., source remover 306 of FIG. 3), and the source remover may apply the mask to the first audio mix in order to remove any off-axis noise from the first audio mix. In some embodiments, step 716 further includes adjusting an aggressiveness of the mask, for example, by applying a scaling factor to the ratio of the first audio mix to the second audio mix, as described herein. In other embodiments, step 716 further includes adjusting an aggressiveness of the removal of the off-axis noise from the first audio mix by attenuating the second audio mix prior to calculating the mask. In some embodiments, the mask has a value that ranges from about zero to about one, wherein a mask value of zero means the full mask is applied and a mask value of one means no mask is applied. In some embodiments, the source remover may be configured to operate in the frequency domain, such that the mask is applied to each sub-band of the audio signals. The process 700 may end once step 716 is complete.

Figure 8:
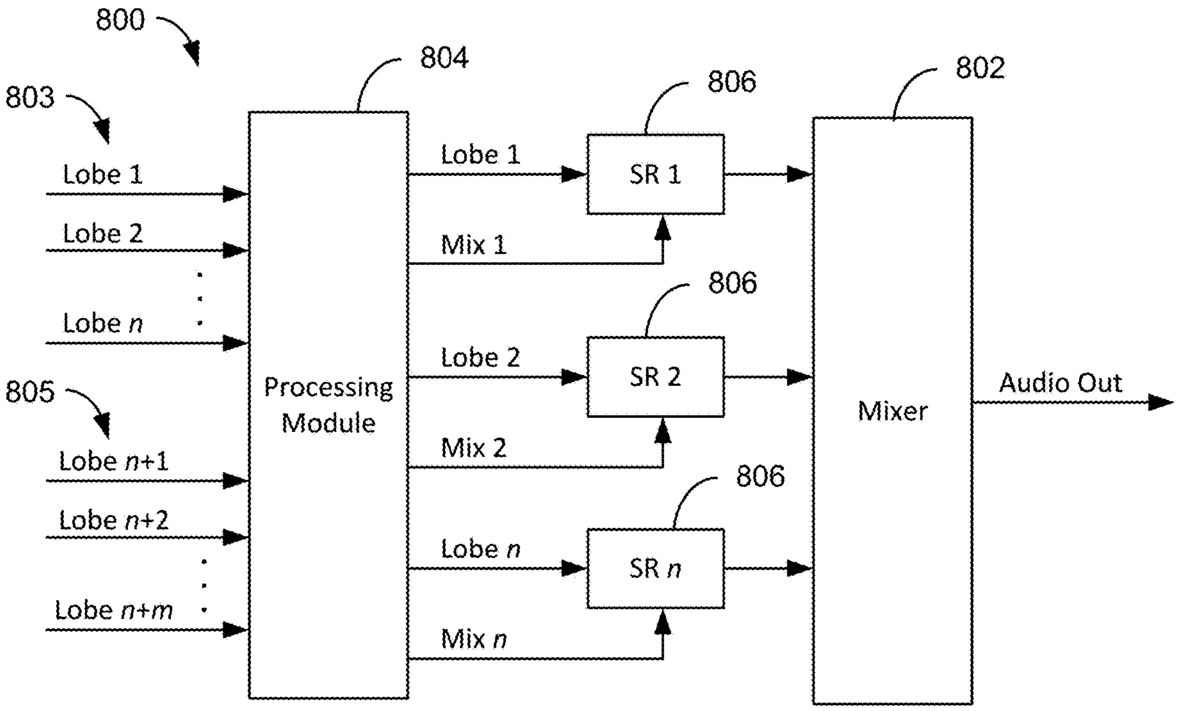
FIG. 8 is a schematic diagram of an exemplary audio processor that may be included in the system of FIG. 2, in accordance with one or more embodiments.

FIG. 8 illustrates another exemplary audio processor 800 that may be used to implement the audio processor 206 shown in FIG. 2, in accordance with some embodiments. As shown, the audio processor 800 comprises an audio mixer 802, a processing module 804, and a plurality of source removers 806. Each of the source removers 806 (e.g., "SR 1," "SR 2," etc.) may be similar to the source remover 306 of FIG. 3, the source remover 500 of FIG. 5, the source remover 600 of FIG. 6, or any combination thereof, or otherwise configured to implement one or more of the source removal techniques described herein.

According to embodiments, the audio processor 800 can be configured to pair each inner lobe with an appropriate outer lobe based on a proximity between the lobes and apply source removal techniques to each pairing, before generating a desired audio mix at the audio mixer 802. As explained with reference to FIG. 5, for example, the source removal may be more or most effective when the desired speech source and the interference source are sufficiently separated, angularly (e.g., by about 180 degrees, by at least 90 degrees, etc.) and/or physically (e.g., at opposite sides relative to the audio coverage area). Accordingly, the audio processor 800 can improve an effectiveness of the source removers 806, as a whole, by creating lobe pairs that have sufficient, or maximum, separation, and providing each pair of lobes to a separate source remover 806 for individualized source removal.

More specifically, as shown in FIG. 8, the processing module 804 includes a first plurality of inputs, or input audio channels, for respectively receiving in-coverage audio signals 803, or the audio signals captured by inner lobes (e.g., Lobe 1 to n) deployed within an active audio coverage area (e.g., audio coverage area 106 of FIG. 1). In addition, the processing module 804 includes a second plurality of inputs for respectively receiving out-of-coverage audio signals 805, or the audio signals captured by outer lobes (e.g., Lobes n+1 to n+m) deployed outside the active audio coverage area.

The processing module 804 also receives location information (not shown) for each of the audio signals 803 and 805 and/or in association with each of the inner lobes and each of the outer lobes. The location information may include an audio source location, or the location of the audio source that produced the audio signal; a lobe location, or the location towards which the lobe that picked up the audio signal is directed; or any other location associated with the audio signal. In some embodiments, the location information may include localization coordinates and/or other data included in the location data 214 received from microphone 202 of FIG. 2.

In various embodiments, the processing module 804 can be configured (e.g., using an algorithm or other software) to determine or calculate a physical distance and/or angular separation between a given inner lobe and each of the outer lobes, for example, based on the location information received in association with the lobes, and pair or associate the given inner lobe with the outer lobe that is located furthest from the inner lobe and/or has the greatest angular separation. For example, in FIG. 1, Lobe 1 may be paired with Lobe 5, since the angular and/or physical distance between Lobe 1 and Lobe 5 is greater than that between Lobe 1 and Lobe 4. For similar reasons, each of Lobe 2 and Lobe 3 may be paired with Lobe 4, instead of Lobe 5, for example.

In cases where multiple out-of-coverage audio signals 805 contribute to off-axis noise in a given in-coverage audio signal 803, or multiple outer lobes are sufficiently separated from a given inner lobe, the processing module 804 may be configured to generate a mix of the appropriate out-of-coverage audio signals 805 and pair the out-of-coverage mix (e.g., "Mix 1," "Mix 2," etc.) with the corresponding in-coverage audio signal 803, as shown. In such cases, the processing module 804 may include an audio mixer, an audio mixing module, or other component for mixing the audio signals.

In some embodiments, the processing module 804 may be further configured to estimate or measure an energy level of the outer lobe signals and based thereon, determine which of the outer lobes to use for pairing purposes and/or include in the out-of-coverage mixes. For example, an outer lobe typically produces low signal energies when there is no active audio source at the lobe location (e.g., the talker isn't talking or has moved). Such lobes need not be included in the out-of-coverage mix or paired with an inner lobe, as will be appreciated.

The processing module 804 can be further configured to provide the audio signals associated with a given pairing of lobes to the same source remover 806 in order to maximize removal of the corresponding out-of-coverage audio signal(s) 805 (or mix) from the in-coverage audio signal 803 paired therewith. As shown, the processing module 804 may include a plurality of outputs, or output audio channels, for providing the in-coverage signals 803 and out-of-coverage mixes to appropriate inputs of the source removers 806. For example, in FIG. 1, the in-coverage audio signal 803 associated with Lobe 1 may be provided to a first source remover 806 (or "SR 1") as the "desired" input signal, and an audio mix (e.g., "Mix 1") comprising the one or more out-of-coverage audio signals 805 associated with Lobe 5 may be provided to the first source remover 806 as the "interference" input signal. Using the techniques described herein, the first source remover 806 can be configured to calculate a mask based on Mix 1 from Lobe 5 (e.g., using a ratio of the desired signal to the interference signal), and apply the mask to the in-coverage audio signal 803 from Lobe 1, thus removing off-axis noise from Lobe 1 due to acoustic bleeding from Lobe 5.

In some embodiments, each of the source removers 806 also includes a data input (not shown) for receiving control data from the processing module 804 for controlling an aggressiveness of the mask applied by the given source remover 806. As described herein, the aggressiveness of the mask can be controlled using a scalar having any value on a scale of 0 (or no removal) to 1 (or full removal). In various embodiments, the processing module 804 may be configured to calculate a scalar value for each pair of lobes (e.g., Lobe 1 and Lobe 5 in FIG. 1) based on, or as a function of, the physical and/or angular separation between the corresponding lobes, and provide the calculated value to the corresponding source remover 806 (e.g., via its data input) as an aggressiveness scalar. For example, the aggressiveness scalar may have a high value if the paired lobes are in close proximity to each other, or have a physical and/or angular separation that is below a preset threshold (e.g., about twenty degrees). Likewise, the aggressiveness scalar may have a low value if the paired lobes are sufficiently separated, or have a physical and/or angular separation that exceeds the preset threshold. In this manner, each source remover 806 can be configured to customize, or individually scale, an aggressiveness of its own mask based on the specific audio sources assigned to that source remover 806, instead of applying the same or generic scalar to all masks. In other embodiments, the audio processor 800 may be configured to adjust an aggressiveness of the source removal, or the removal of off-axis noise from each desired audio mix, by adjusting a signal level of the out-of-coverage mixes before they are received at the source removers 806, or prior to calculating the masks. In such cases, each Mix 1, 2, or n may be attenuated, or amplified, depending on a desired aggressiveness for the corresponding source remover 806, as described herein.

In embodiments, the modified, or noise-removed, output of each source remover 806 can be provided to the audio mixer 802 to generate a desired audio mix. The audio mixer 802 may be an automixer, automixing module, or any other type of mixer configured to generate a mixed audio signal that conforms to a desired mix of the audio signals received at one or more inputs, for example, similar to the first audio mixer 302 of FIG. 3. As shown, the audio mixer 802 includes a plurality of input channels for respectively receiving a modified audio signal from each of the plurality of source removers 806, and an output for providing the mixed audio output, or desired audio mix.

According to various embodiments, the processing module 804 may be implemented in hardware and/or in software stored in a memory of the audio processor 800 or other component of the audio system 200. Though FIG. 8 shows them as separate components, in other embodiments, any of the audio mixer 802, the processing module 804, and/or the plurality of source removers 806 may be combined into a single component of the audio processor 800. In still other embodiments, certain components of the audio processor 800 may be separately included in other devices, such as, for example, the microphone 202 of FIG. 2, or a computing device of the audio system 200.

Figure 9:
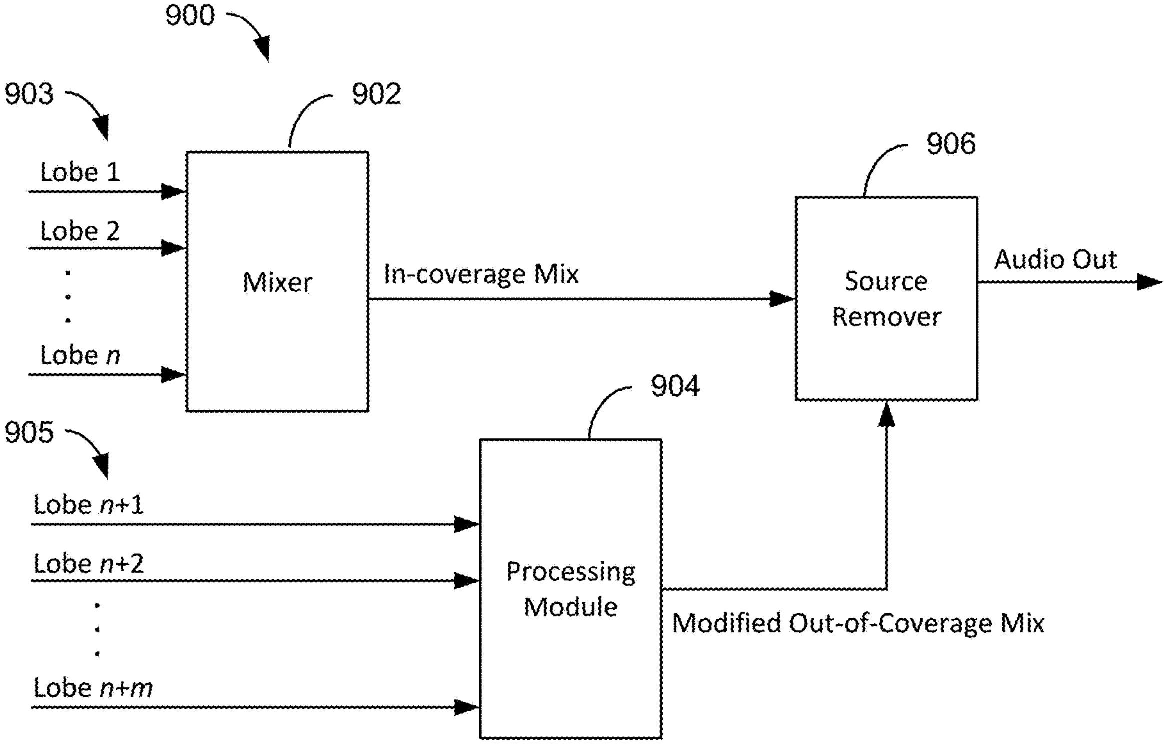
FIG. 9 is a schematic diagram of another exemplary audio processor that may be included in the system of FIG. 2, in accordance with one or more embodiments.

FIG. 9 illustrates another exemplary audio processor 900 that may be used to implement the audio processor 206 shown in FIG. 2, in accordance with some embodiments. As shown, the audio processor 900 comprises an audio mixer 902 for generating a desired audio mix based on in-coverage audio signals 903, a processing module 904 for generating a modified mix of out-of-coverage audio signals 905 based on proximity between inner lobes and/or outer lobes, and a source remover 906 for removing off-axis noise from the desired audio mix using a mask calculated based on the modified out-of-coverage mix. The source remover 906 may be similar to the source remover 306 of FIG. 3, the source remover 500 of FIG. 5, the source remover 600 of FIG. 6, or any combination thereof, or otherwise configured to implement one or more of the source removal techniques described herein. In embodiments, the processing module 904 can be configured to generate a modified out-of-coverage mix that emphasizes or de-emphasizes certain out-of-coverage audio signals 905, so that the source remover 906 can more heavily remove the audio signals 905 that contribute more noise to the in-coverage mix, or otherwise improve source removal in the desired audio mix.

As shown in FIG. 9, the audio mixer 902 includes a plurality of input audio channels for respectively receiving a plurality of in-coverage audio signals 903 captured by inner lobes (e.g., Lobe 1, Lobe 2, etc.) deployed within an audio coverage area (e.g., audio coverage area 106 in FIG. 1). The audio mixer 902 also includes an output audio channel for providing a desired mix of the in-coverage audio signals 903 (or "desired in-coverage mix") to a "desired" input of the source remover 906. In embodiments, the audio mixer 902 may be substantially similar to the first audio mixer 302 of FIG. 3.

As also shown, the processing module 904 includes a plurality of inputs, or input audio channels, for respectively receiving a plurality of out-of-coverage audio signals 905 captured by outer lobes (e.g., Lobe n+1, Lobe n+2, etc.) deployed outside the audio coverage area. The processing module 904 also includes an output, or output audio channel, for providing a modified mix of the out-of-coverage audio signals 905 to an "interference" input of the source remover 906. Though not shown, the processing module 904 also receives location information for each of the audio signals 903 and 905 and/or in association with each of the inner lobes and each of the outer lobes, like the processing module 804 of FIG. 8.

In embodiments, the processing module 904 can be configured (e.g., using an algorithm or other software) to generate a modified mix of the out-of-coverage audio signals 905 that is designed to cause the source remover 906 to more aggressively remove the out-of-coverage audio signals 905 that have a louder presence in the in-coverage audio signals 903. In particular, the processing module 904 can be configured to apply a gain, or frequency weight, to one or more of the out-of-coverage audio signals 905 based on, or as a function of, a physical and/or angular separation of the inner lobes relative to each other and/or the outer lobes. The processing module 904 may determine or calculate the physical and/or angular separation between a given inner lobe and each of the other inner lobes, as well as each of the outer lobes, based on the location information received for each of the lobes. Based on the separation information, the processing module 904 can determine or identify which of the outer lobes is likely to make a greater contribution to, or have a louder presence in, the inner lobes. As an example, if two or more inner lobes (e.g., Lobes 2 and 3 in FIG. 1) are in close proximity to the same outer lobe (e.g., Lobe 5 in FIG. 1), sounds from that outer lobe may be picked up by, or bleed into, both inner lobes and thus, may be included in at least two of the audio signals 903 that are mixed together by the audio mixer 902 to generate the in-coverage mix.

In some embodiments, for each outer lobe identified as being close to multiple inner lobes, the processing module 904 may calculate a gain, or frequency weight, based on the number of inner lobes that are in close physical and/or angular proximity to the outer lobe, the actual distance and/or angular separation between that outer lobe and each nearby inner lobe, and/or any other relevant separation information that results in a higher gain being calculated for the out-of-coverage audio signal 905 corresponding to that outer lobe. For example, the processing module 904 may apply a gain of more than one to the noisier out-of-coverage audio signals 905 in order to emphasize them and thus, increase their removal power when the out-of-coverage mix is used to calculate the source removal mask. In other embodiments, the processing module 904 may instead apply a lower gain to the other out-of-coverage audio signals 905, i.e. those captured by the outer lobes that are further away from the identified outer lobe, in order to de-emphasize the other out-of-coverage audio signals 905 compared to the noisier signal 905. For example, the processing module 904 may apply a gain of less than one to the other signals 905. As will be appreciated, other techniques may be used to adjust or modify a frequency shape of the out-of-coverage mix to improve the effectiveness of the source remover 906.

In various embodiments, the processing module 904 applies the calculated gain(s) to the corresponding out-of-coverage audio signals 905 before combining or mixing the out-of-coverage audio signals 905 together and outputting the modified out-of-coverage mix to the source remover 906. The source remover 906 then calculates a mask based on a ratio of the in-coverage mix to the modified out-of-coverage mix, using the techniques described herein, and applies the mask to the in-coverage mix (e.g., by multiplying the in-coverage mix by the mask) to remove off-axis noise. Thus, the audio processor 900 can be configured to more aggressively, or heavily, remove, from a desired audio output, an out-of-coverage audio source that is in close proximity to two or more of the in-coverage lobes and therefore, is responsible for, or contributes to, a higher proportion of the acoustic bleeding in the in-coverage mix.

According to various embodiments, the processing module 904 may be implemented in hardware and/or in software stored in a memory of the audio processor 900 or other component of the audio system 200. Though FIG. 9 shows them as separate components, in other embodiments, any of the audio mixer 902, the processing module 904, and/or the source remover 906 may be combined into a single component of the audio processor 900. In still other embodiments, certain components of the audio processor 900 may be separately included in other devices, such as, for example, the microphone 202 of FIG. 2, or a computing device of the audio system 200.

In various embodiments, any of the beamformers and/or microphones described herein may be further configured to provide audio fencing coverage of desired and interfering sources that are located in the same direction and thus, have at least partially overlapping lobes, due to the physics of the beamformer, for example. More specifically, when a desired audio source and an interfering or noise source are located in the same azimuth direction, or otherwise have directionally similar locations, there may be significant overlap between the in-coverage and out-of-coverage lobes that are respectively steered towards the two sources. A large overlap in lobe locations can lead to various problems, including sub-optimal noise removal and/or audio mixing. In some embodiments, the beamformer and/or microphone can be configured to use cosine angle information to determine the best coverage option for desired and interfering sources located in the same direction. In some cases, the beamformer and/or microphone may be configured to measure the overlap in lobe placement for directionally similar sources and strategically place a single lobe to cover both sources. For example, the beamformer may be configured to adjust the lobe's position so that the desired audio source is covered when a desired talker is speaking and the interference source is covered when the desired talker is not speaking. In such cases, the audio signals captured at the different lobe positions may be used as the desired and reference inputs to the source remover in order to remove noise from the desired audio, as described herein.

In various embodiments, any of the audio processors and/or microphones described herein may be further configured to account for jitter in the localization information received for a given talker or other desired audio source. More specifically, due to the stochastic nature of acoustics, talker positions are rarely static and often contain jitter that makes the exact source location uncertain. This can be especially problematic for an audio source that is located at or near the "acoustic fence," or the border between an in-coverage area and an out-of-coverage area, because in such cases, the source location may be interpreted as being both inside and outside the coverage area depending on the jitter direction. When it comes to source removal, jitter in the source location can lead to jitter in the final audio output if a given audio source is constantly mixed and removed based on its fluctuating location. In some embodiments, the audio processor and/or microphone can be configured to use spatial-temporal hysteresis to account for a spatial signature of a border source, or an audio source that is on or near the border between an in-coverage area and an out-of-coverage area. In some cases, the audio processor and/or microphone may use Euclidian distances between lobe locations and detected audio activity locations to determine the most probable location for lobe placement within the audio source's spatial signature. The audio processor and/or microphone may also use a spatial-temporal timer to measure how often the audio source is active versus inactive and how much spatial variation is occurring at its location within a particular time period. These temporal results can be used to slow down the rate at which the audio source is classified as an in-coverage source or an out-of-coverage source, and thus reduce jitter in the application of source removal for the final audio output.

In various embodiments, any of the audio processors and/or microphones described herein may be further configured to provide gradual source removal for audio sources located at or near the acoustic fence, or the border between an in-coverage area and an out-of-coverage area, to help minimize the impact of audio source jitter at the border. In particular, appropriate roll-off gain staging may be used to adjust an attenuation gain or volume of a lobe positioned close to the border, so that audio sources located at or near the border have less relevance, or weight, in the final audio output. For example, the areas surrounding the edges of a given in-coverage area, or the portions adjacent to the out-of-coverage areas, may be designated as "roll-off regions," or the areas where roll-off gain staging is applied. The gain gradient for such roll-off regions may range from 0 decibels (dB) of attenuation for audio sources located at or near an inner edge of the roll-off region (i.e. adjacent to the in-coverage area), to −12 dB of attenuation for audio sources located at or near an outer edge of the roll-off region (i.e. adjacent to the out-of-coverage area). According to some embodiments, the audio processor and/or microphone may be configured to determine the roll-off gain for a given lobe based on Euclidian distances, such as the lobe's distance from the center of the in-coverage area or other relevant distance measurement. This causes the linear slope of the roll-off region to be shallower, or less steep, which enables more gradual source removal near the acoustic fence.

While specific techniques are described herein for calculating the mask used for removal of off-axis noise, or to otherwise isolate one audio source from another, it should be appreciated that other techniques may be used instead. For example, in some embodiments, the source remover may be configured to calculate a mask for removing off-axis noise from desired audio using Equation 5:

$$\text{mask} = \text{mic\_power}/(\text{mic\_power} + \text{ref\_power} + EPS), \quad (5)$$

where mic_power is the desired audio (e.g., d), ref_power is the interfering audio, or noise, (e.g., r), and EPS is a very small number included to prevent a divide by zero situation. In such cases, the mask is still calculated based on the desired audio signal and the interfering or noise audio signal, albeit using a different formula and may still be used as described herein. For example, the mask value may still have any value in the range of about zero (i.e. full mask applied) to about one (i.e. no mask applied), and the desired audio may be multiplied by the mask value to obtain a modified audio output (e.g., dr=d*m) free of off-axis noise, as described herein. In addition, the mask value may be applied to each frequency bin, e.g., when the source remover operates in the frequency domain, and may be modified to scale for aggressiveness, as also described herein. In various embodiments, the mask may be calculated using any of a number of equations so long as the mask value (e.g., m) approaches one as the desired signal power (e.g., d) increases relative to the interfering signal power (e.g., r), and the mask value approaches 0 as the interfering signal power increases relative to the desired signal power.

Thus, the techniques described herein can be used to remove, from a mix of desired audio signals captured within an audio coverage area, off-axis noise due to unwanted sounds from outside the audio coverage area bleeding into the desired audio signals. In particular, a source remover can be configured to remove the off-axis noise by applying a mask to the desired audio mix, the mask being calculated based on the out-of-coverage audio signals and the desired audio signals.

Referring back to FIG. 2, in various embodiments, the audio system 200 may also include various components that are not shown in FIG. 2, such as, for example, one or more loudspeakers, display screens, computing devices, and/or cameras. In addition, one or more of the components in the system 200 may include one or more digital signal processors or other processing components, controllers, wireless receivers, wireless transceivers, etc., though not shown or mentioned above. It should be understood that the components shown in FIG. 2 are merely exemplary, and that any number, type, and placement of the various components in the system 200 are contemplated and possible.

One or more components of the audio system 200 may be in wired or wireless communication with one or more other components of the system 200. For example, the microphone 202 may transmit the plurality of audio signals 210 to the beamformer 204, the audio processor 206, or a computing device comprising one or more of the same, using a wired or wireless connection. In some embodiments, one or more components of the audio system 200 may communicate with one or more other components of the system 200 via a suitable application programming interface (API). For example, one or more APIs may enable components of the audio processor 206 to transmit audio and/or data signals between themselves.

In some embodiments, one or more components of the audio system 200 may be combined into, or reside in, a single unit or device. For example, all of the components of the audio system 200 may be included in the same device, such as the microphone 202, or a computing device that includes the microphone 202. As another example, the audio processor 206 may be included in, or combined with, the microphone 202, in addition to or instead of the beamformer 204. In some embodiments, the audio system 200 may take the form of a cloud based system or other distributed system, such that the components of the system 200 may or may not be physically located in proximity to each other.

The components of the audio system 200 may be implemented in hardware (e.g., discrete logic circuits, application specific integrated circuits (ASIC), programmable gate arrays (PGA), field programmable gate arrays (FPGA), digital signal processors (DSP), microprocessor, etc.), using software executable by one or more servers or computers, or other computing device having a processor and memory (e.g., a personal computer (PC), a laptop, a tablet, a mobile device, a smart device, thin client, etc.), or through a combination of both hardware and software. For example, some or all components of the microphone 202, the beamformer 204, and/or the audio processor 206 may be implemented using discrete circuitry devices and/or using one or more processors (e.g., audio processor and/or digital signal processor) executing program code stored in a memory (not shown), the program code being configured to carry out one or more processes or operations described herein, such as, for example, method 700 shown in FIG. 7. Thus, in embodiments, one or more of the components of the audio system 200 may include one or more processors, memory devices, computing devices, and/or other hardware components not shown in the figures.

All or portions of the processes described herein, including method 700 of FIG. 7, may be performed by one or more processing devices or processors (e.g., analog to digital converters, encryption chips, etc.) that are within or external to the audio system 200 of FIG. 2. In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the method 700. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

Any of the processors described herein may include a general purpose processor (e.g., a microprocessor) and/or a special purpose processor (e.g., an audio processor, a digital signal processor, etc.). In some examples, the processor(s) described herein may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Any of the memories or memory devices described herein may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory described herein includes multiple kinds of memory, particularly volatile memory and non-volatile memory.

Moreover, any of the memories described herein may be computer readable media on which one or more sets of instructions can be embedded. The instructions may reside completely, or at least partially, within any one or more of the memory, the computer readable medium, and/or within one or more processors during execution of the instructions. In some embodiments, the memory described herein may include one or more data storage devices configured for implementation of a persistent storage for data that needs to be stored and recalled by the end user. In such cases, the data storage device(s) may save data in flash memory or other memory devices. In some embodiments, the data storage device(s) can be implemented using, for example, SQLite data base, UnQLite, Berkeley DB, BangDB, or the like.

Any of the computing devices described herein can be any generic computing device comprising at least one processor and a memory device. In some embodiments, the computing device may be a standalone computing device included in the audio system 200, or may reside in another component of the audio system 200, such as, e.g., the microphone 202, the audio processor 206, or the beamformer 204. In such embodiments, the computing device may be physically located in and/or dedicated to the given environment or room, such as, e.g., the same environment in which the microphone 202 is located. In other embodiments, the computing device may not be physically located in proximity to the microphone 202 but may reside in an external network, such as a cloud computing network, or may be otherwise distributed in a cloud-based environment. Moreover, in some embodiments, the computing device may be implemented with firmware or completely software-based as part of a network, which may be accessed or otherwise communicated with via another device, including other computing devices, such as, e.g., desktops, laptops, mobile devices, tablets, smart devices, etc. Thus, the term "computing device" should be understood to include distributed systems and devices (such as those based on the cloud), as well as software, firmware, and other components configured to carry out one or more of the functions described herein. Further, one or more features of the computing device may be physically remote and may be communicatively coupled to the computing device.

In some embodiments, any of the computing devices described herein may include one or more components configured to facilitate a conference call, meeting, classroom, or other event and/or process audio signals associated therewith to improve an audio quality of the event. For example, in various embodiments, any computing device described herein may comprise a digital signal processor ("DSP") configured to process the audio signals received from the various microphones or other audio sources using, for example, automatic mixing, matrix mixing, delay, compressor, parametric equalizer ("PEQ") functionalities, acoustic echo cancellation, and more. In other embodiments, the DSP may be a standalone device operatively coupled or connected to the computing device using a wired or wireless connection. One exemplary embodiment of the DSP, when implemented in hardware, is the P300 IntelliMix Audio Conferencing Processor from SHURE, the user manual for which is incorporated by reference herein in its entirety. As further explained in the P300 manual, this audio conferencing processor includes algorithms optimized for audio/video conferencing applications and for providing a high quality audio experience, including eight channels of acoustic echo cancellation, noise reduction and automatic gain control. Another exemplary embodiment of the DSP, when implemented in software, is the IntelliMix Room from SHURE, the user guide for which is incorporated by reference herein in its entirety. As further explained in the IntelliMix Room user guide, this DSP software is configured to optimize the performance of networked microphones with audio and video conferencing software and is designed to run on the same computer as the conferencing software. In other embodiments, other types of audio processors, digital signal processors, and/or DSP software components may be used to carry out one or more of audio processing techniques described herein, as will be appreciated.

Moreover, any of the computing devices described herein may also comprise various other software modules or applications (not shown) configured to facilitate and/or control the conferencing event, such as, for example, internal or proprietary conferencing software and/or third-party conferencing software (e.g., Microsoft Skype, Microsoft Teams, Bluejeans, Cisco WebEx, GoToMeeting, Zoom, Join.me, etc.). Such software applications may be stored in the memory of the computing device and/or may be stored on a remote server (e.g., on premises or as part of a cloud computing network) and accessed by the computing device via a network connection. Some software applications may be configured as a distributed cloud-based software with one or more portions of the application residing in the computing device and one or more other portions residing in a cloud computing network. One or more of the software applications may reside in an external network, such as a cloud computing network. In some embodiments, access to one or more of the software applications may be via a web-portal architecture, or otherwise provided as Software as a Service (SaaS).

In general, a computer program product in accordance with embodiments described herein includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others). In some embodiments, the program code may be a computer program stored on a non-transitory computer readable medium that is executable by a processor of the relevant device.

The terms “non-transitory computer-readable medium” and “computer-readable medium” include a single medium or multiple media, such as a centralized or distributed database, and/or associated caches and servers that store one or more sets of instructions. Further, the terms “non-transitory computer-readable medium” and “computer-readable medium” include any tangible medium that is capable of storing, encoding, or carrying a set of instructions for execution by a processor or that cause a system to perform any one or more of the methods or operations disclosed herein. As used herein, the term “computer readable medium” is expressly defined to include any type of computer readable storage device and/or storage disk and to exclude propagating signals.

Any process descriptions or blocks in the figures, such as, e.g., FIG. 7, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as is known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. The above description is intended to be taken as a whole and interpreted in accordance with the principles taught herein and understood to one of ordinary skill in the art.

In this disclosure, the use of the disjunctive is intended to include the conjunctive. The use of definite or indefinite articles is not intended to indicate cardinality. In particular, a reference to “the” object or “a” and “an” object is intended to also denote one of a possible plurality of such objects.

This disclosure describes, illustrates, and exemplifies one or more particular embodiments of the invention in accordance with its principles. The disclosure is intended to explain how to fashion and use various embodiments in accordance with the technology rather than to limit the true, intended, and fair scope and spirit thereof. That is, the foregoing description is not intended to be exhaustive or to be limited to the precise forms disclosed herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The embodiment(s) provided herein were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally, and equitably entitled.

What is claimed is:

1. A method using at least one processor in communication with at least one microphone, the method comprising:

deploying, using the at least one microphone, a first microphone lobe towards a first location, the first microphone lobe configured to capture one or more first audio signals from a first audio source located within a first audio pick-up region;

deploying, using the at least one microphone, a second microphone lobe towards a second location, the second microphone lobe configured to capture one or more second audio signals from a second audio source located outside the first audio pick-up region; and removing, using the at least one processor, off-axis noise from the one or more first audio signals by applying, to the one or more first audio signals, a mask determined based on the one or more second audio signals.

2. The method of claim 1, further comprising: calculating, using the at least one processor, the mask based on the one or more second audio signals and the one or more first audio signals.

3. The method of claim 1, wherein the mask has a value that ranges from about zero to about one.

4. The method of claim 1, wherein the off-axis noise comprises audio from the second audio source that is picked up by the first microphone lobe.

5. The method of claim 1, further comprising: generating a first audio mix using the one or more first audio signals; generating a second audio mix using the one or more second audio signals; and calculating the mask based on the first audio mix and the second audio mix.

6. The method of claim 1, further comprising: calculating, using the at least one processor, the mask using a neural network and based on the one or more first audio signals and the one or more second audio signals.

7. The method of claim 1, further comprising:

identifying, using the at least one microphone, the first audio source as being located at the first location within the first audio pick-up region; and identifying, using the at least one microphone, the second audio source as being located at the second location outside the first audio pick-up region.

8. The method of claim 7, further comprising:

receiving, from the at least one microphone, localization data for the first audio source and the second audio source; and using the localization data to determine whether each of the first audio source and the second audio source are within the first audio pick-up region.

9. A system comprising:

at least one microphone configured to:

deploy a first microphone lobe towards a first location to capture one or more first audio signals from a first audio source located within a first audio pick-up region, and deploy a second microphone lobe towards a second location to capture one or more second audio signals from a second audio source located outside the first audio pick-up region; and at least one processor communicatively coupled to the at least one microphone and configured to remove off-axis noise from the one or more first audio signals by applying, to the one or more first audio signals, a mask determined based on the one or more second audio signals.

10. The system of claim 9, wherein the at least one processor is further configured to calculate the mask based on the one or more second audio signals and the one or more first audio signals.

11. The system of claim 9, wherein the mask has a value that ranges from about zero to about one.

12. The system of claim 9, wherein the off-axis noise comprises audio from the second audio source that is picked up by the first microphone lobe.

13. The system of claim 9, wherein the at least one processor comprises:

a first audio mixer configured to generate a first audio mix using the one or more first audio signals;

a second audio mixer configured to generate a second audio mix using the one or more second audio signals; and a source remover configured to calculate the mask based on the second audio mix and apply the mask to the first audio mix.

14. The system of claim 9, wherein the at least one processor is further configured to calculate the mask using a neural network and based on the one or more first audio signals and the one or more second audio signals.

15. The system of claim 9, wherein the at least one microphone is further configured to:

identify the first audio source as being located at the first location within the first audio pick-up region, based on localization data for the first audio source; and identify the second audio source as being located at the second location outside the first audio pick-up region, based on localization data for the second audio source.

16. The system of claim 9, further comprising a beamformer configured to: deploy the first microphone lobe and the second microphone lobe for the at least one microphone.

17. The system of claim 16, wherein the beamformer is included in the at least one microphone.

18. The system of claim 9, wherein the at least one processor is included in the at least one microphone.

19. A non-transitory computer-readable storage medium comprising instructions that, when executed by at least one processor, cause the at least one processor to perform:

deploy, using at least one microphone, a first microphone lobe towards a first location, the first microphone lobe configured to capture one or more first audio signals from a first audio source located within a first audio pick-up region;

deploy, using the at least one microphone, a second microphone lobe towards a second location, the second microphone lobe configured to capture one or more second audio signals from a second audio source located outside the first audio pick-up region; and remove off-axis noise from the one or more first audio signals by applying, to the one or more first audio signals, a mask determined based on the one or more second audio signals.

* * * * *